(12) United States Patent
Wills et al.

(10) Patent No.: US 12,513,659 B2
(45) Date of Patent: Dec. 30, 2025

(54) SYSTEMS AND METHODS FOR SEARCHING MICROWAVE PATHS BETWEEN SITES

(71) Applicant: Wireless Applications Corp., Bellevue, WA (US)

(72) Inventors: Eric Wills, Bellevue, WA (US); Abdelelah Salama, Bellevue, WA (US)

(73) Assignee: Wireless Applications Corp., Bellevue, WA (US)

( * ) Notice: Subject to any disclaimer, the term of this patent is extended or adjusted under 35 U.S.C. 154(b) by 363 days.

(21) Appl. No.: 18/175,978

(22) Filed: Feb. 28, 2023

(65) Prior Publication Data

US 2024/0057024 A1 Feb. 15, 2024

Related U.S. Application Data

(60) Provisional application No. 63/398,053, filed on Aug. 15, 2022.

(51) Int. Cl.
*H04W 64/00* (2009.01)
*H04B 17/27* (2015.01)
(Continued)

(52) U.S. Cl.
CPC .......... *H04W 64/006* (2013.01); *H04B 17/27* (2015.01); *H04B 17/391* (2015.01);
(Continued)

(58) Field of Classification Search
CPC ... H04W 64/006; H04W 16/18; H04W 48/16; H04W 72/0446; H04W 88/02; H04W 24/02; H04W 4/029; H04W 36/02; H04W 40/12; H04W 28/12; H04W 28/10; H04W 48/18; H04W 72/56; H04W 84/18; H04W 28/06; H04W 40/24; H04W 16/10; H04W 16/14; H04W 28/021; H04W 52/241; H04W 64/00; H04W 72/04; H04W 72/20; H04W 72/27; H04W 72/51; H04W 72/54;
(Continued)

(56) References Cited

U.S. PATENT DOCUMENTS

2008/0008146 A1* 1/2008 Oikawa .................. H04W 36/02 370/338
2021/0068031 A1* 3/2021 Wills .................... H04W 16/18
(Continued)

*Primary Examiner* — Nimesh Patel
(74) *Attorney, Agent, or Firm* — Perkins Coie LLP

(57) ABSTRACT

A microwave path search tool for finding radio path trails between a source site at a first geographic location and a target site at a second geographic location, wherein radio paths constituting a radio path trail meet certain radio link design goals subject to certain design constraints. The tool receives information relating to the source and target sites and sites within a buffer region around the source and target sites. The tool also receives path profile computation information such as data representing the terrain and clutter in the buffer region. The tool uses this information to analyze potential radio paths and identify radio paths forming a radio link between the source and target sites that best meets the radio link design goals. The tool can also perform pre-run analysis and use incrementally increasing linear or segmented expansions of search areas within the buffer region to facilitate the radio path search.

20 Claims, 28 Drawing Sheets

(51) Int. Cl.
*H04B 17/391* (2015.01)
*H04W 16/18* (2009.01)
*H04W 48/16* (2009.01)

(52) U.S. Cl.
CPC ........ *H04B 17/3912* (2015.01); *H04W 16/18* (2013.01); *H04W 48/16* (2013.01)

(58) Field of Classification Search
CPC ............. H04W 72/563; H04W 52/242; H04W 72/044; H04W 8/005; H04W 8/00; H04W 8/26; H04W 80/00; H04W 92/14; H04W 92/20; H04W 4/38; H04W 28/26; H04W 24/08; H04W 52/245; H04W 52/46; H04W 72/02; H04W 24/10; H04W 28/0231; H04W 28/0236; H04W 72/12; H04W 72/541; H04W 72/542; H04W 72/569; H04W 84/042; H04W 40/02; H04W 16/00; H04W 72/00; H04W 4/025; H04W 4/30; H04W 40/246; H04W 84/12; H04W 88/16; H04W 92/02; H04W 92/12; H04W 88/14; H04W 84/22; H04B 17/27; H04B 17/391; H04B 17/3912; H04B 7/022; H04B 7/15592; H04B 7/18539; H04B 1/7113; H04B 1/7117; H04B 7/155; H04B 7/00; H04B 7/15507; H04B 7/15535; H04B 17/345; H04B 17/309; H04B 17/336; H04B 7/0413; H04B 7/0452; H04B 7/18519; H04B 17/3913; H04B 17/318; H04B 10/1149; H04B 13/02; H04B 7/0817; H04B 7/18591; H04L 41/0895; H04L 1/1854; H04L 12/00; H04L 41/16; H04L 43/0876; H04L 47/125; H04L 43/16; H04L 43/20; H04L 45/42; H04L 5/0058; H04L 5/006; H04L 61/00; H04L 61/10; H04L 61/50; H04L 65/65; H04L 12/1827; H04L 65/80; H04L 9/40; H04L 47/24; H04L 47/805; H04L 5/0007; H04L 12/1836; H04L 41/14; H04L 41/122; H04L 41/40; H04L 41/145; Y02D 30/70; G01S 19/21; G01S 19/02
See application file for complete search history.

(56) References Cited

U.S. PATENT DOCUMENTS

2024/0056206 A1* 2/2024 Wills .................... H04B 17/27
2024/0057023 A1* 2/2024 Wills .................... H04W 48/16

* cited by examiner

SYSTEMS AND METHODS FOR SEARCHING MICROWAVE PATHS BETWEEN SITES

CROSS-REFERENCE TO RELATED APPLICATION(S)

This application claims the benefit of U.S. Provisional Patent Application No. 63/398,053, filed Aug. 15, 2022, which is incorporated by reference herein in its entirety.

BACKGROUND

There is ever increasing demand for high speed, reliable, and economical long distance radio communication between terrestrial locations, requiring that the wireless communication links be properly designed and properly situated in just the right geographic locations. Determining what the right geographic locations to deploy wireless radios and antennas can be difficult particularly where there are several potential sites to choose from, and where the radio links need to extend to hundreds or even thousands of miles. The choice of radio site often should allow for the lowest infrastructure build costs while ensuring that the wireless radio paths constituting the radio link can individually and collectively perform as intended.

A large number of potential radio sites between the target locations to be wirelessly interconnected can lead to a large number of permutations of viable or candidate sites that could be used to create the radio link, where different selections and ordering of sites can result in radio links with different performance. Determining which permutations of radio sites can yield wireless links with the desired performance can be complicated by variations in existing infrastructure at the potential sites, by spatial variations in terrain and clutter, and by other physical and radio frequency (RF) propagation limitations between the target locations. There is therefore a need for a wireless design and analysis tool that can accurately, simply, efficiently, and rapidly assist in identifying potential sites in a given area to install radio infrastructure equipment to build or extend wireless communication links meeting certain targeted radio link performance.

BRIEF DESCRIPTION OF THE DRAWINGS

Detailed descriptions of implementations of the present invention will be described and explained using the accompanying drawings.

FIG. 5 is an example user interface of a microwave path search tool showing structure data.

FIG. 16 is a display of a second example of failed radio paths.

FIG. 17B is a display of the example radio path trail of FIG. 17A after optimizing the radio path trail.

Figure 1:
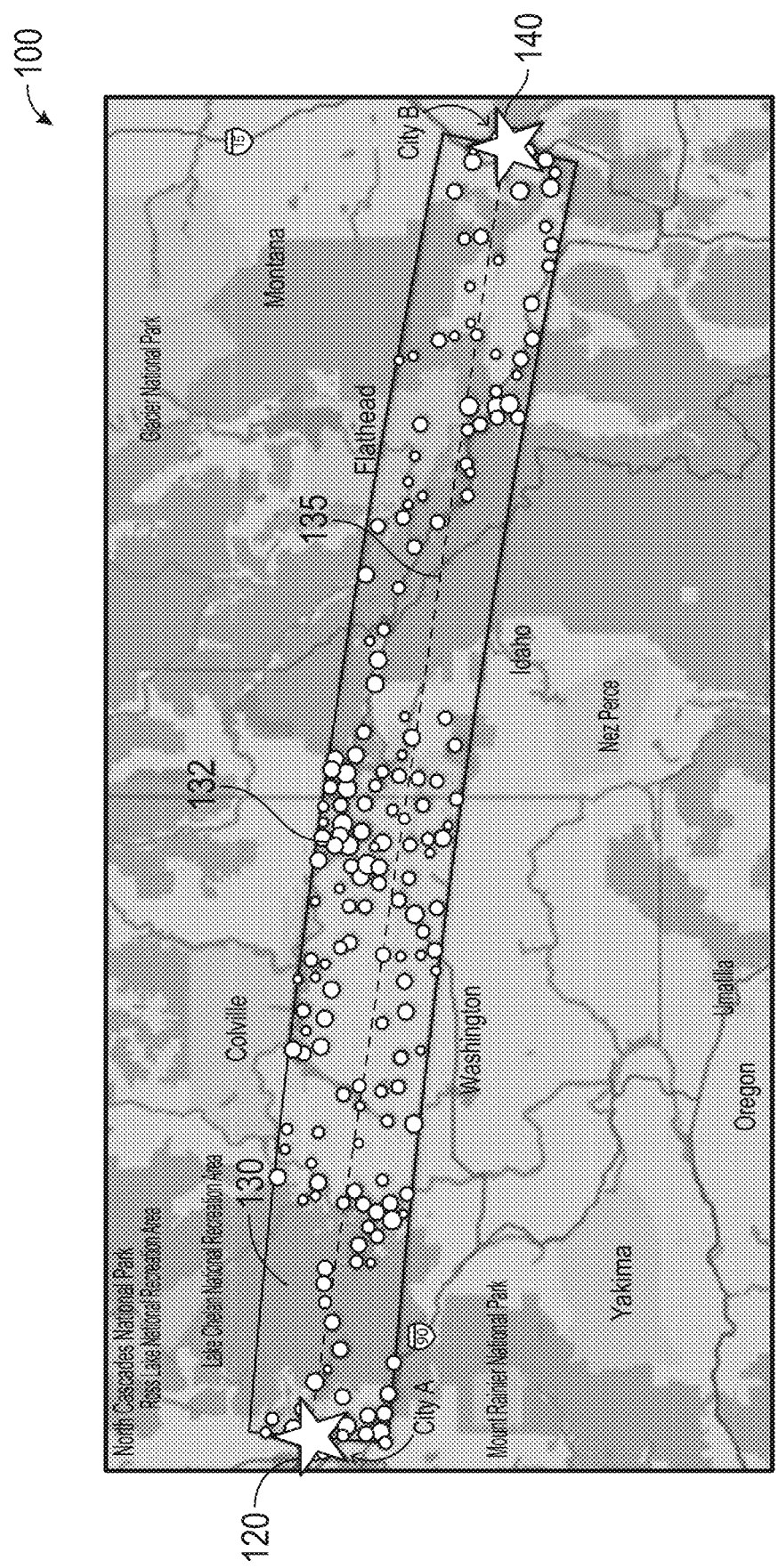
FIG. 1 is a map showing a distribution of candidate sites within a bounded region between two locations.

The technologies described herein will become more apparent to those skilled in the art from studying the Detailed Description in conjunction with the drawings. Embodiments or implementations describing aspects of the disclosed technology are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications, such modifications falling within the scope of the present disclosure.

DETAILED DESCRIPTION

The description and associated drawings disclose a microwave path search tool to identify radio path trails between two or more radio frequency (RF) sites when (i) there is not a single radio path available between the two sites and (ii) a radio path trail must therefore be routed between multiple intermediary RF sites to generate a connected radio path. In one aspect of the disclosed technology, the microwave path search tool finds radio path trails between a source site at a first geographic location and a target site at a second geographic location, where the trail traverses sites within a buffer area around the source and target sites. The microwave path search tool can include a set of microwave or radio frequency design and analysis tools which can be used separately or together with the path-finding function.

A radio path trail consists of two or more path segments in a buffer area between and around sites. Radio path segments constituting the trail meet certain radio link design goals (e.g., minimize latency of each segment and of entire trail, have clearance, etc.) and are subject to certain design constraints (e.g., are within a minimum and maximum distance constraint, meet clearance considering clutter and antenna height constraints, etc.). Each segment is selected to meet certain design goals (e.g., each segment meets coverage) and the segments are selected such that the trail meets certain design goals (e.g., the trail meets a minimum latency even when different segments add different amounts of latency).

To search for radio path trail(s) meeting the radio link design goals, the tool receives information on the source site, the target site, and sites within the buffer area (e.g., latitude/longitude coordinates, heights of antenna-mounting structures at the sites, etc.); receives design constraints (e.g., a maximum and minimum length of a segment of the trail); and receives the design goals (e.g., clearance required for each path segment, objectives of the radio link such as need to minimize latency of each segment and of entire trail, etc.). Using the received information, the tool computes one or more radio path profiles between sites in certain expansion areas within the buffer area by assessing the viability and performance of multiple different path segments falling within the buffer area. The tool determines optimal collections of radio path segments that form radio path trails that best meet the radio link design goals.

In another aspect of the disclosed technology, the microwave path search tool can search for radio path trails using incrementally increasing linear buffer expansions of a search area within the buffer area, starting from a small expansion area around the straight line connecting the source and target sites. If a complete trail from the source to the target site is not found within the initial small search area, the tool can increase the search area to encompass a larger portion of the buffer area exposing more sites that can be used to continue the trail towards the target site.

In another aspect of the disclosed technology, the microwave path search tool can search for radio path trails using incrementally increasing segmented buffer expansions of the search area within the buffer area in lieu of or in addition to the linear buffer expansions. Starting from the source site, a search area around the source site can be based on a segment region oriented towards the target site, where the maximum segment length is based on the maximum distance constraint. The radio path trail can extend from the last site in the first/initial segment towards the target site by defining a new segment around the last site. If no valid paths exist within a segment (e.g., no paths meeting clearance subject to the design constraints or no sites at all within the segment), the tool can expand the segment to enclose more sites and paths to be considered in subsequent path search iterations.

In another aspect of the disclosed technology, the microwave path search tool can perform certain pre-run analysis, such as analyzing records of radio links filed with a regulatory authority, to determine certain statistical properties of existing radio paths or existing radio links in the geographic area (e.g., existing links within a certain distance from, or within a certain area proximate to or encompassing the source/target sites). The distance of the existing radio links from the source/target site can be a predetermined distance or can be determined dynamically by the tool, such that the existing radio links can provide a decent indicator on the type of radio links possible between the source and target site. From the existing radio links, the tool can determine a recommended minimum and maximum distance to set as a design constraint.

In another aspect of the disclosed technology, the tool can analyze the sites in the buffer area to determine if, given the design constraints and before computing radio path profiles, a radio path trail can be found or if the number of paths that would need to be analyzed are likely to exceed a maximum number of paths that the tool can efficiently handle.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Microwave Path Search

FIG. 1 is an example map 100 that illustrates a distribution of sites (e.g., site 132) within a bounded geographic region 130 between two locations, location 120 (e.g., in City A) and location 140 (e.g., in City B). The sites in the distribution of sites represent structures in the bounded region 130 at which a wireless network operator can mount microwave or other directional radio frequency (RF) antennas. For example, sites may include antenna towers or other structures that are currently licensed or may be licensed for the placement of directional antennas (e.g., structures with existing RF radios or antennas or structures that could potentially be licensed to install directional antennas).

A wireless network operator that desires to wirelessly link location 120 to location 140 (e.g., to create a wireless point-to-point link connecting the two locations), would be interested to determine which of the sites in the distribution of sites would be the best to mount wireless radio equipment (e.g., mount directional antennas). The network operator would also be interested to know the least amount of infrastructure equipment that they would need to deploy within the bounded region to build the wireless link meeting their design objectives. A design objective can be, for example, that the link has a latency below a target threshold latency (or the best possible latency). The design objective could also be that the radio link or radio path trail has the highest throughput attainable; has the best link reliability; has the straightest geodesic route; has the fewest number of deployed radios/antennas; has the cheapest infrastructure cost, etc. Design objectives may be selected based on the service level promised by the wireless network operator to its customers, by the type of traffic carried on the wireless links, by the desired bandwidth of the wireless link, or by other commercial considerations of the network operator.

With potentially hundreds or even thousands of potential or candidate sites within the bounded region 130, it can be difficult (e.g., time and resource intensive) to determine which sites can serve as relay sites to relay the radio signal from a site A (at location 120) to a site B (at location 140) while meeting the operator's design objectives. For example, if the operator's design objective is to build a radio link with the lowest latency, having one point-to-point (PtP) radio at site A and another at site B might provide the lowest latency but the distance between sites A and B might be too large to allow for such a radio link. Alternatively, having one or more relay radios positioned along the straight line 135 connecting sites A and B could yield the straightest geodesic route between sites A and B and potentially the second lowest latency possible, but there may not be sites along the line 135 within certain distances from each other available for relay radios or it may be difficult to traverse the straightest geodesic route given obstructions in the path. The operator would therefore potentially need to go through each combination of sites to determine which sites would best meet their objectives.

Additionally, each hop or segment in the radio path trail or route (e.g., each path segment relayed by relay radios), must be built to support the operator's design goal or objective for the entire link (e.g., each hop or segment must not degrade the link quality). For example, if the operator's design objective is to build a radio link with the lowest latency, the operator would prefer to: (1) use the least number of relay sites because each additional relay site radio adds to the total latency; (2) minimize the distance between relay sites because longer links increase the latency; (3) ensure each segment supports the operator's design goal, among other criteria. For example, if it is determined that three sites S, R, and T, when used as relays to create the radio link connecting site A to site B, results in a link that best meets the operator's objective, each of the four segments A-to-S, S-to-R, R-to-T, and T-to-B would have been found to meet the operator's design goal, e.g., each segment has a clear line of sight, or has a certain percentage of Fresnel zone clearance (e.g. first Fresnel zone clearance), etc. It can be time consuming and compute resource intensive to go through each site to determine that sites S, R, and T are the most optimal, particularly where there are many sites between sites A and B, where site A and B can be separated by hundreds and even thousands of miles, and where the bounded region 130 can extend to tens or hundreds of miles from line 135). It is therefore desirable to have a microwave path search tool that is able to accurately, efficiently, and rapidly analyze the radio path profiles of candidate or potential sites to determine which sites can be used to build a radio link between two locations, all while ensuring that the radio link meets certain design objectives (e.g., a lowest attainable latency). For example, it is desirable to have a microwave path search tool that analyzes and identifies which sites include structures that support mounting and use of a directional antenna of the size required to traverse a distance between a corresponding site and a next site of a radio path trail, while ensuring that each segment of the radio path trail meets specified design objectives and successfully navigates about obstructions (e.g., valleys, hills, mountains, etc.) using flexible routing (e.g., such as by identifying and including segments in the radio signal path of up to 180 degrees away from the path direction between the origin site and the terminus site, when a path towards the terminus site is not available from an intermediate site).

Figure 2:
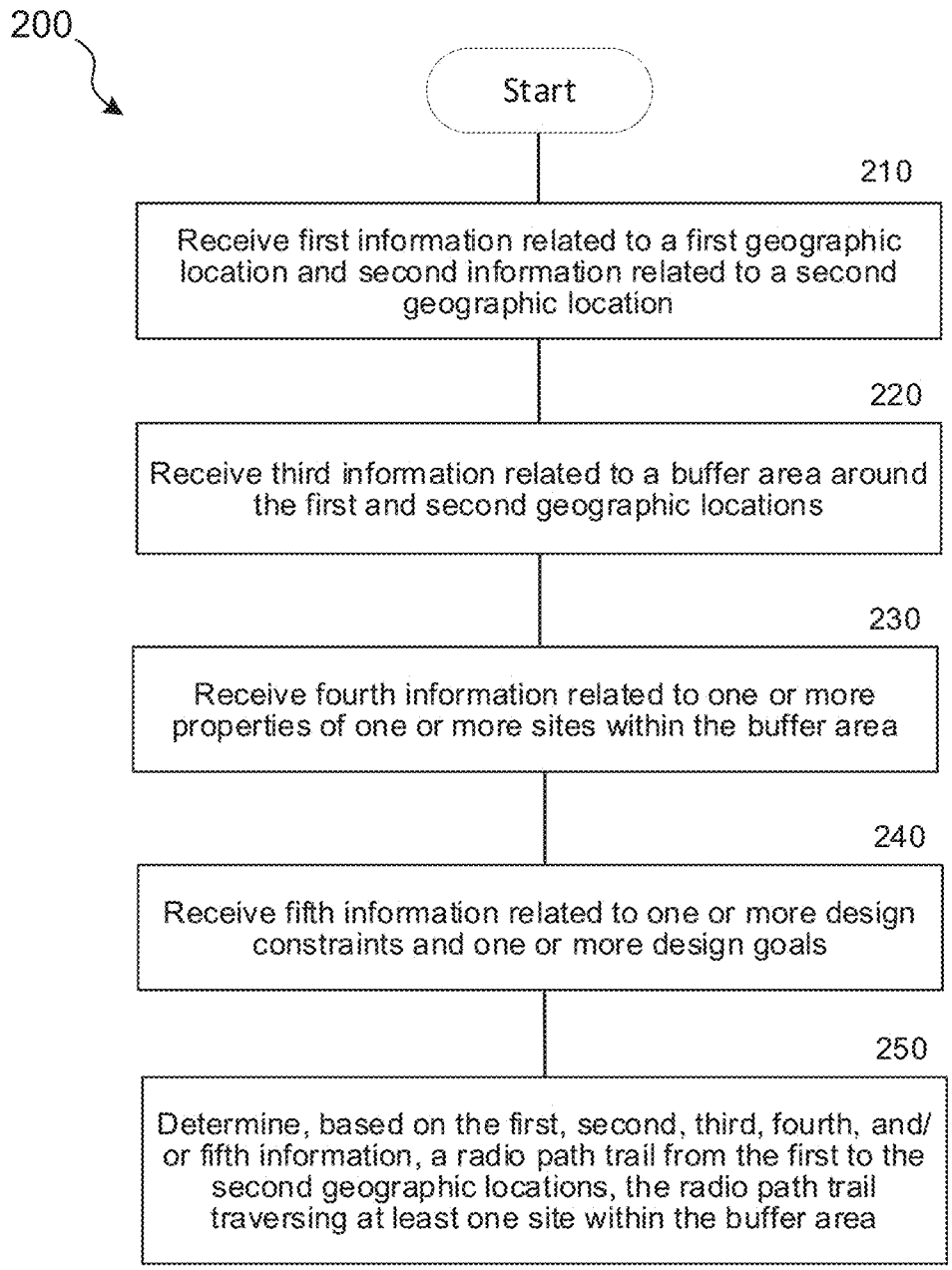
FIG. 2 is a flowchart that illustrates a process for finding potential microwave paths between two locations.

FIG. 2 is a flowchart 200 that illustrates a process implemented by the tool for finding potential microwave paths to build a radio path trail between two distant locations. At block 210, the microwave path search tool receives first information related to a first geographic location (e.g., site A at location 120 in FIG. 1) and second information related to a second geographic location (e.g., site B at location 140 in FIG. 1). The first and second information specifies the location of each corresponding site, typically expressed in latitude/longitude coordinates. In some implementations, receiving the first information and the second information also includes receiving an indication of properties of structures (e.g., the type of structure at each location, the height of the structures, etc.) at the first geographic location and the second geographic location. The indication can be received from a user of the microwave path search tool by clicking on two points displayed in a map by the tool to select two sites between which the user wishes to design a radio link. When the user selects the points, the tool can query a record (e.g., a list, database, or other collection of stored data) to obtain properties of structures at the selected locations.

The tool can assign a default structure height at the first and/or second locations when the underlying record does not indicate a height (e.g., use a default height of 100 ft if record does not indicate height of structure at the source and/or destination of the radio link being designed). The tool can also assign a default type of structure (e.g., a mid-rating score, such as a score that can be used to analyze RF equipment loading as described in greater detail below) when the record does not indicate a type of structure at the first and/or second locations.

Figure 3:
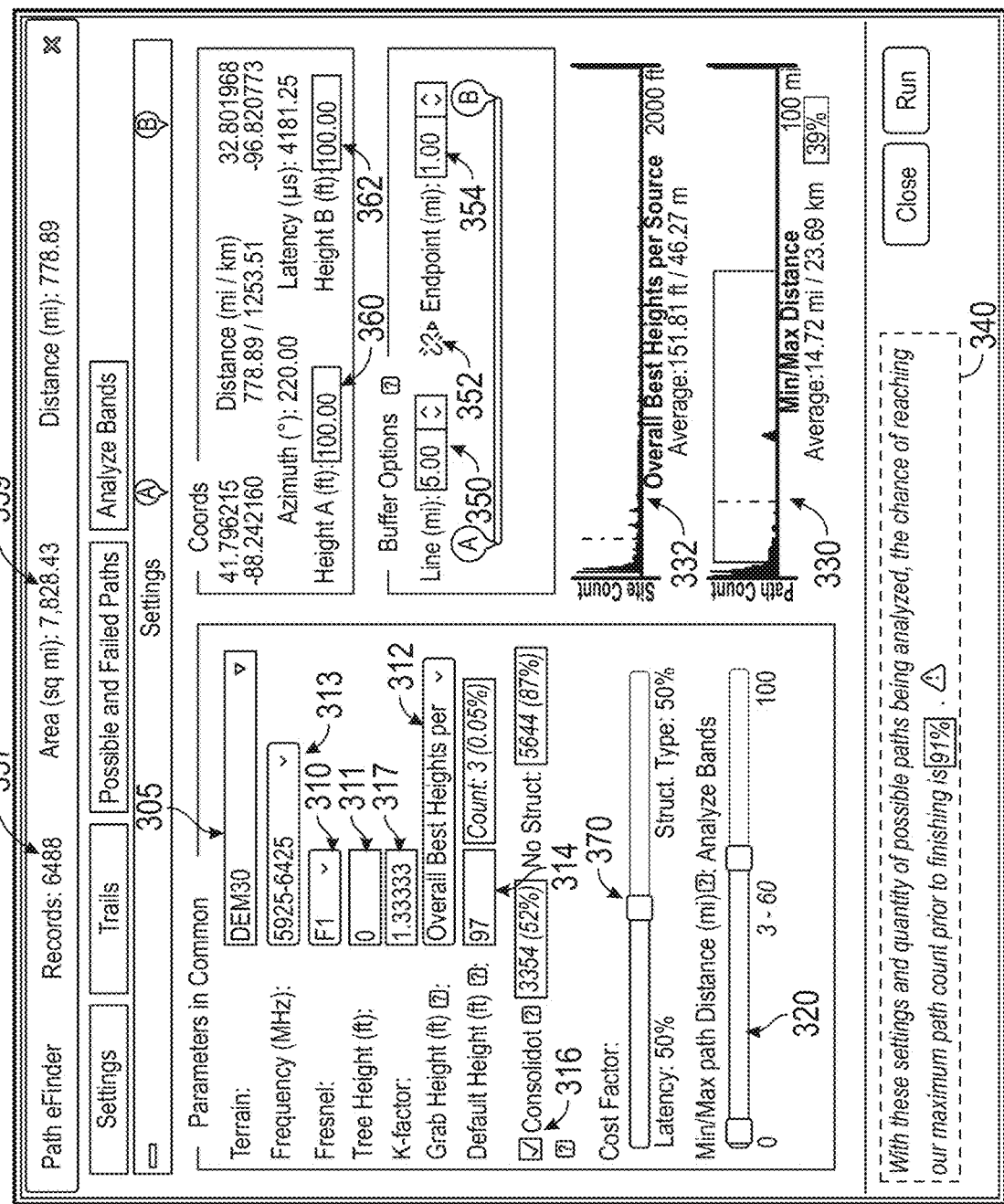
FIG. 3 shows a user interface to receive and visualize certain microwave path search parameters.

The user can also enter the location information or properties via a user interface (e.g., a graphical user interface). For example, an illustration of an example user interface is shown in FIG. 3 in which a user can enter or otherwise view location information or properties, and can visualize certain microwave path search parameters. More specifically, a user can enter a structure height for site A in field 360 and a structure height for site B in field 362.

Referring again to FIG. 2, at block 220 the microwave path search tool receives third information related to a buffer area around and enclosing the first and second geographic locations (e.g., around and enclosing site A and site B). For example, the microwave path search tool can receive information related to an extent of a first buffer region beyond the first location, an extent of a second buffer region beyond the second location, and an extent of a third buffer on either side of the line connection the first and second location. That is, the distance beyond the geographic location of site A (opposite from direction of site B), the distance beyond the geographic location of site B (opposite from direction of site A), and the distances on either side of the line connecting sites A and B.

Figure 4A:
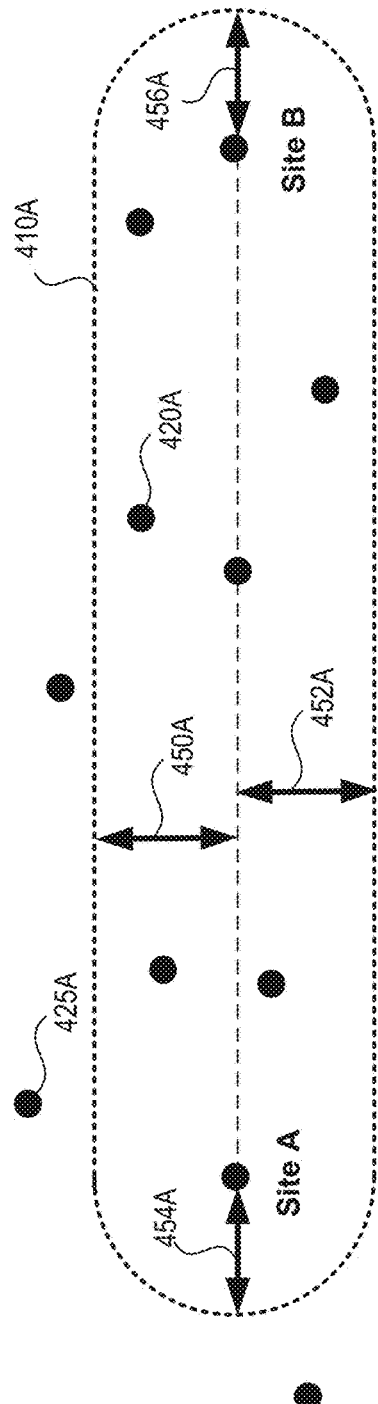
FIG. 4A is a map showing a symmetric buffer area.
Figure 4B:
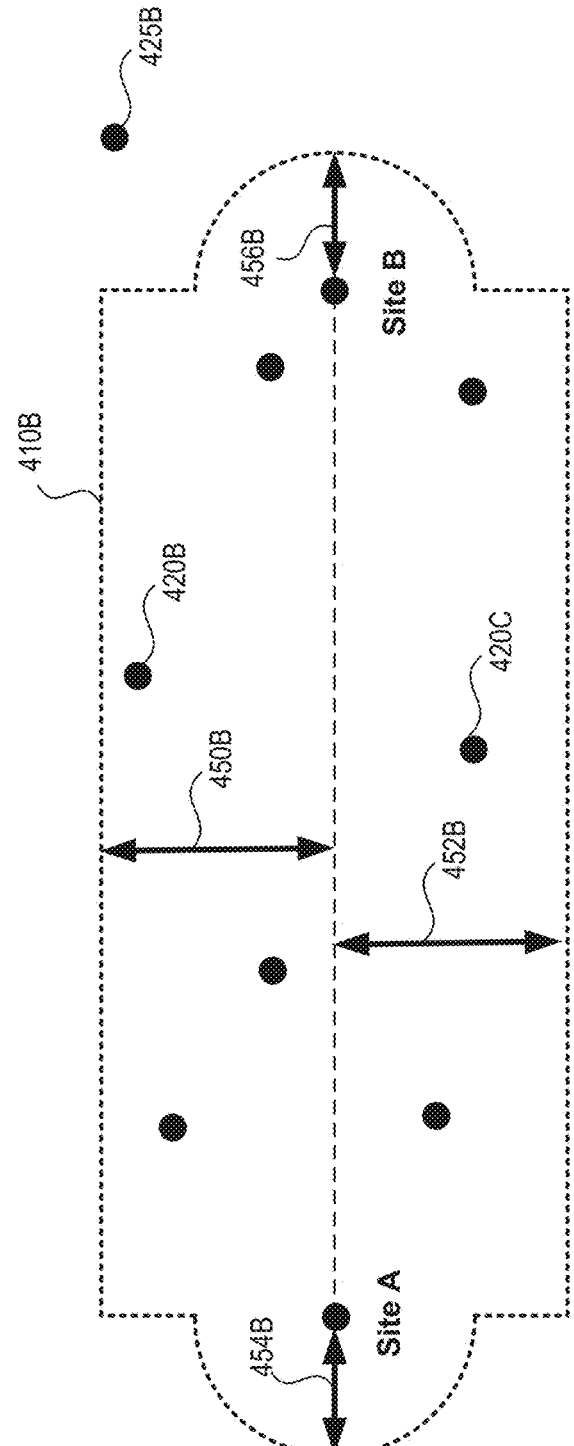
FIG. 4B is a map showing an asymmetric buffer area.

For example, as depicted in FIG. 3, the microwave path search tool can include a selection box 354 to enter or select the lengths of the first and second buffer regions (e.g., lengths 454A/456A in FIGS. 4A and 454B/456B in FIG. 4B), and a selection box 350 to enter the length of third buffer regions (e.g., lengths 450A and 452A in FIG. 4A, and 450B and 452B in FIG. 4B). The microwave path search tool can allow for symmetric or asymmetric buffer regions, for example, by unlinking the line and endpoints using selection box 352 to allow selection of a third buffer region that is different from the first and second buffer regions.

FIG. 4A is an example map that illustrates a symmetric buffer area defined by bounding region 410A and FIG. 4B is an example map that illustrates an asymmetric buffer area defined by bounding region 410B. In FIG. 4A, the buffer regions on either side of the straight line between site A and site B (lengths 450A and 452A entered with selection box 350 in FIG. 3) is equal in width to the buffer region beyond site A and site B (lengths 454A and 456A entered with selection box 354 in FIG. 3). In FIG. 4B, the buffer regions on either side of the straight line between site A and B (distance 450B and 452B) is not equal in width to the buffer region beyond site A and B (distance 454B and 456B).

In some implementations, the user can draw (e.g., using a user interface of the microwave path search tool) an arbitrary region bounding sites A and B to define the buffer area. In some implementations, the buffer area bounding region can be imported into the microwave path search tool, and/or the microwave path search tool can determine or modify the bounding region based on additional factors (e.g., terrain or clutter data and other physical and environmental conditions in the area).

The microwave path search tool only considers the sites within the bounded regions 410A or 410B when determining which sites would result in the best link (e.g., the link that best meets the design objectives) between site A and site B. For example, sites 420A, 420B, and 420C would be considered because they fall within the bounding regions 410A and 410B, but sites 425A and 425B would be excluded in the radio path search because they are outside of the bounding regions 410A and 410B.

Because the buffer area can limit the number of paths found, the size of the buffer area can depend on the density of sites in the area or the computational ability of a processor or server executing instructions for performing the radio path search. A large density of sites (many sites per square area) can require a smaller buffer area and a sparse density of sites (a few sites per square area) can require a wider buffer area to increase the probability of finding a trail between site A and site B. More radio paths to evaluate in the buffer area can increase the computational load of the processor. The size and extent of the buffer area can also be based on other criteria, for example, to encompass sites available to license and exclude areas with sites ineligible to license. In some implementations, the microwave path search tool can automatically determine the buffer bounding region based on various parameters such as structure density, computational complexity in solving for optimal trails, etc. For example, the microwave path search tool may set a buffer bounding region to include N potential sites, where N is determined by the computational complexity associated with calculating the various path permutations through those N sites.

In some implementations, the line buffer region and the endpoint buffer region can be asymmetric (e.g., length 450A can be different from length 452A, and length 454A can be different from length 456A).

Referring again to FIG. 2, at block 230 the microwave path search tool retrieves fourth information related to one or more properties of one or more sites within the buffer area. In some implementations, the tool retrieves a record that includes properties of sites in the geographic area which encompasses the buffer area (not just the records for sites within the buffer area). For example, the tool retrieves existing structure data of sites from an existing portfolio or queries for structure data from different sources including from the FCC, the FAA, tower companies, etc. As a specific example, the user interface illustrated in FIG. 3 includes (i) a label 357 indicating that the microwave analysis tool has received 6488 records shown, and (ii) a label 359 indicating that the buffer area encompasses 7,828.43 square miles.

Figure 5:
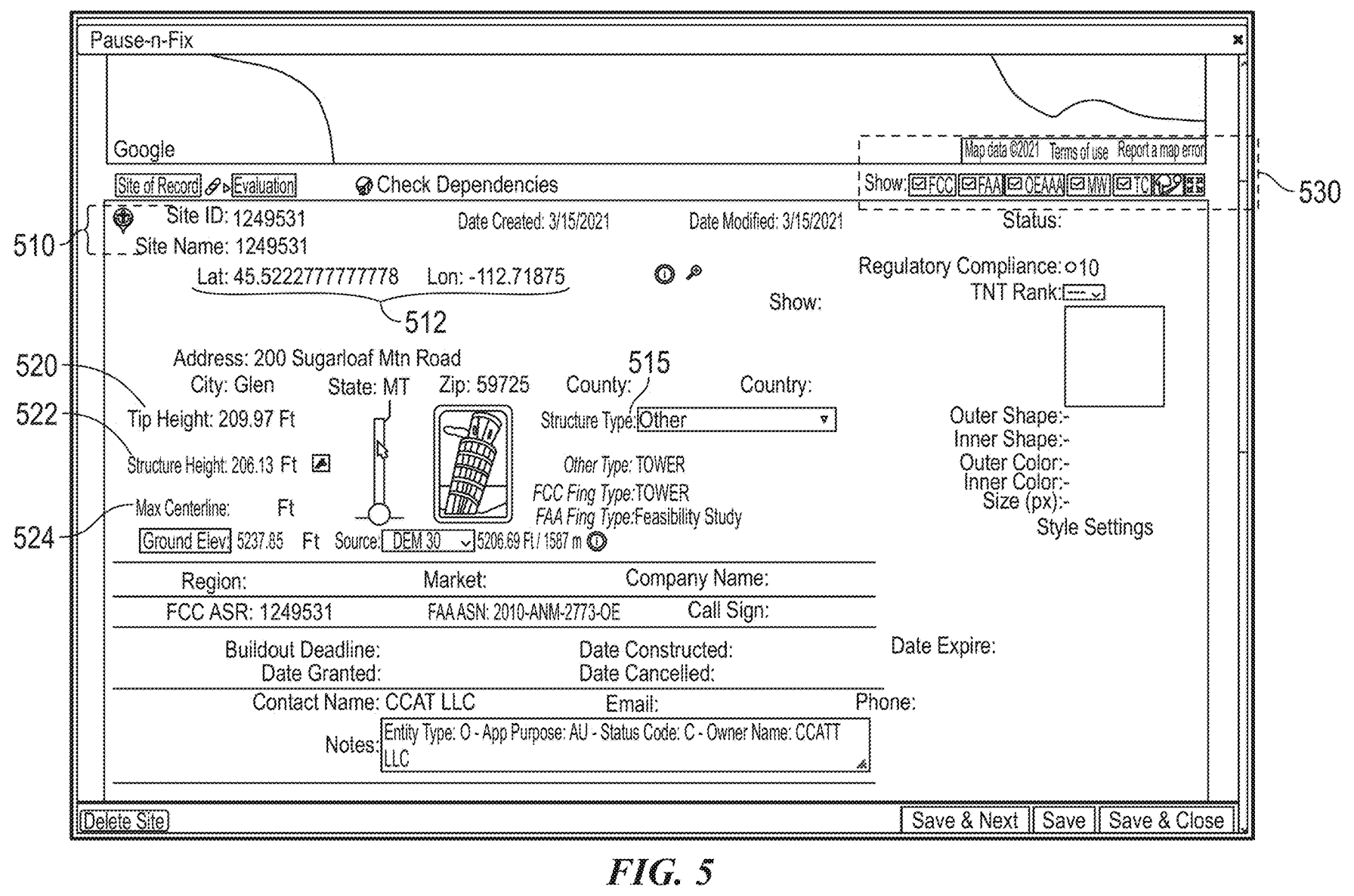

The existing structure data can include a type of structure at each site and the height of the structure. For example, FIG. 5 is an example user interface (UI) of the microwave path search tool showing structure data from different sources selected using options 530 (e.g., FCC, FAA, OEAA, etc.). More specifically, FIG. 5 illustrates an example site record UI that can be accessed when a user clicks on a site in a map of available sites within a geographic area. As shown, the site record can include a site or structure identifier 510 (e.g., a name, and ID of the site or structure), GPS coordinates or a location 512 of the site (e.g., a latitude/longitude of the site), and a structure identifier type 515 at the site. Additionally, the structure data in the site record can include different height parameters of the structure at the site including a tip height 520, a structure height 522, and a maximum centerline height 524.

In some embodiments, the tool can generate or assign a score or rating for a structure at each site. The rating assigned to a structure can be based on existing or default structure data, the height of the structure, and/or other data (e.g., terrain or clutter data surrounding the structure, tree height data, etc.), and can provide an indication of the structure's usefulness relative to an optimal structure or other structures at other sites. In one embodiment, the rating can be calculated by the tool using the following equation:

Structure score=($W_1$*Structure type characterization)+($W_2$*Structure height characterization)+($W_3$*Surrounding terrain characterization)

Where (a) the structure type characterization, structure height characterization, and surrounding terrain characterization are each scored on a scale from 0-10; and (b) $W_1$, $W_2$, and $W_3$ are weightings assigned to each of the factors composing a structure score. Assuming, for example, that $W_1+W_2+W_3=1$, the resulting structure score can therefore range from 0 (for a very unsuitable structure) to 10 (for the best structure for that particular site). The values of the weightings $W_1$, $W_2$, $W_3$ can be the same or different from one another, and/or the sum of the weightings $W_1$, $W_2$, and $W_3$ can be greater than or lesser than one (1) such that a maximum computed structure score can be greater than or lesser than ten (10). As a specific example, a monopole structure at a first site might be relatively short in height and able to support a few small dishes/antennas, while a self-support lattice structure at a second site may be relatively tall in height and able to support larger-sized dishes/antennas and/or a larger number of dishes/antennas. In other words, the monopole structure might be useful in forming a smaller number of radio paths and/or radio paths that are relatively short in length, and the self-support lattice structure might be useful in forming a larger number of radio paths and/or radio paths that are relative long in length. Continuing with this example, the tool can assign a lower rating or ranking to the monopole structure than the tool assigns to the self-support lattice structure, indicating that the self-support lattice structure is more useful than the monopole structure (e.g., that an efficiency cost of using the self-support lattice structure is lower than an efficiency cost of using the monopole structure). The ratings assigned to the monopole structure and to the self-support lattice structure may both be lower than a maximum rating or ranking assigned to an optimal structure (e.g., a tower of an optimal height that is (a) able to support an optimal number of dishes/antennas and/or dishes/antennas of an optimal size and/or (b) positioned at a geographic location that is surrounded by optimal terrain or clutter). As discussed above, the tool can assign a structure a default rating (e.g., a mid-rating score, or a score of 5 using the above example in which possible structure score values range from zero (0) to ten (10)) when information of the structure is not available in a record corresponding to the structure. As discussed in greater detail below, the ratings assigned to structures of sites within a buffer area can be used to compute a cost of radio path trails extending between sites within the buffer area, which can be useful in identifying a best radio path trail and/or in analyzing the quality of a given radio path trail.

The microwave path search tool can also consolidate records of sites within a certain distance of each other thereby reducing the number of computations and improving the efficiency of the microwave path search. Consolidation is the process by which the records of multiple sites within a certain proximity of each other are converted to a single site for subsequent computational purposes. For example, the checkbox 316 in FIG. 3 shows that 3354 records out of 6488 records (indicated by label 357) were consolidated. In some implementations, the microwave path search tool can receive user input specifying a threshold distance between sites within which the tool should consolidate sites (e.g., user input specifying a threshold distance of 50 ft can cause the tool to consolidate sites within 50 ft of each other). In some cases, the site data used by the tool has inconsistencies which results in a single site having multiple records with slightly different characterizing parameters. The tool can therefore treat sites within the threshold distance of one another as likely duplicates and consolidate those sites for computation. In order to consolidate multiple sites into a single site for computational purposes, the search tool can take the mean or median position represented by the sites being consolidated. For example, if four sites fall within 100 ft of each other and are to be consolidated to simplify computations, the search tool may generate a consolidated site location that minimizes the sum of the straight line distances between the location of the consolidated site and each of the four sites being consolidated.

After consolidation, the microwave path search tool can use the best or the worst data from the constituent data (or use any other aggregated property of the data corresponding to the consolidated sites, such as average, median, etc.) as the representative data for subsequent analysis (e.g., to determine path profiles between sites, as described in detail below, wherein the best data will yield the most optimistic path profiles and the worst data will yield the most pessimistic profiles). For example, in some implementations, the aggregated property of the consolidated sites can be a maximum height of a structure from among the structures at the consolidated sites. In this case, the tool can use the tallest structure height in the consolidated record or inputted centerline heights of the antennas on the structure, to represent the structure height at the site. Alternatively, the aggregate property can be a minimum height where the tool uses the shortest structure height (to give a more pessimistic result), or an average or median height of all the structure heights in the consolidated records.

Figure 18:
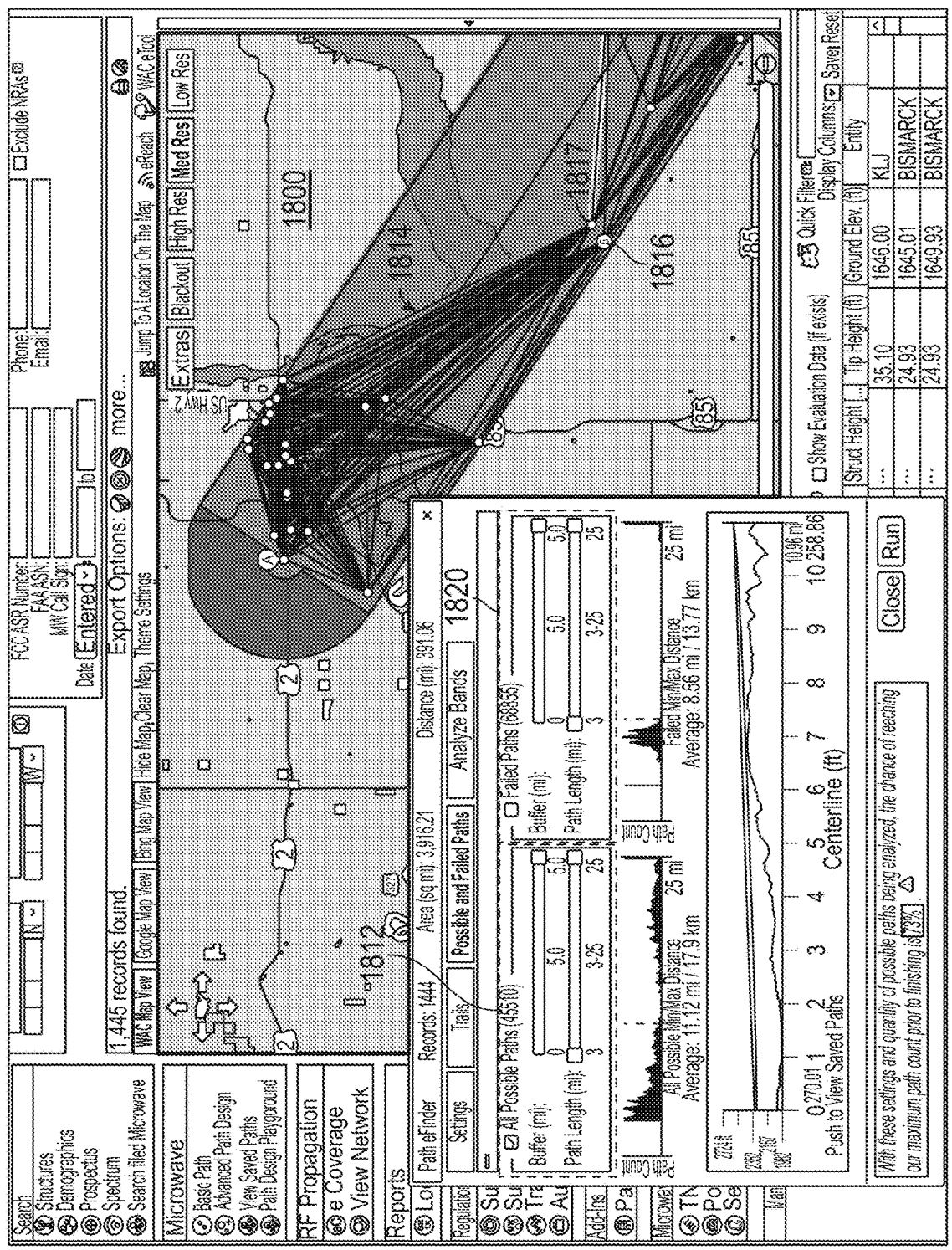
FIG. 18 is a display of example radio path trails including radio path convergence points.

The microwave path search tool can provide, in a visual display of the sites and/or paths/trails, a visual indication of the number of records or quantity of sites consolidated in a displayed single consolidated site (e.g., site 1816 in FIG. 18 shows a single consolidated site with an indication indicating that six (6) records or six (6) sites were consolidated for the displayed site—in this example, the consolidation eliminated the need for the tool to compute at least five radio path profiles from site A to the five other sites and five radio path profiles from the five other sites to a site in the buffer area within a min/max distance of the five other sites).

Referring again to FIG. 2, at block 240 the microwave path search tool receives fifth information related to one or more design constraints and one or more design goals. The design constraints (in addition to the constraints on the buffer area as described above) and design goals allow the tool to find routes or trails or microwave paths between site A and site B that meet a user or network operator's radio link design objectives.

The microwave path search tool can receive (e.g., via a user interface, such as shown in FIG. 3) different design constraints including, for example, a minimum (min) and a maximum (max) distance of each microwave path segment (e.g., a minimum or maximum distance between contiguous or consecutive sites in the radio path trail entered via slider 320 in FIG. 3); a type of height data to grab from a site or structure record (e.g., chosen via selector 312); an estimated default tree height (e.g., entered via text box 311) to use in addition to the terrain and/or clutter data imported into the tool or selected for use with the current run (e.g., via selector 305); the K-factor or effective earth radius multiple to use in determining path profiles between path segments (e.g., entered via text box 317); etc. It will be appreciated that although examples throughout this description have identified various data entry or data capture features such as sliders, text boxes, selection buttons, data file import options, etc., these methods are merely representative and other methods could be utilized to input or capture data into the microwave path search tool.

As described further below with reference to FIG. 19, the minimum and maximum distance can be guided by or determined from knowledge of the maximum and minimum radio links achievable in the geographic area for all or a subset of the frequency bands of interest (e.g., a frequency band of interest specified in selector 313 of FIG. 3). Furthermore, the min/max distance can depend on or be based on the density of sites or structures in the area, the terrain or clutter in the area, the maximum radio link obtainable given the choice of microwave radios and antennas (e.g., frequency band, antenna gain, modulation and coding schemes, MIMO order, etc.), among other criteria. For example, a larger minimum can result in fewer segments (i.e., fewer relay sites) which can improve the network latency where there are enough candidate sites (or can result in longer zigzag segments for sparse site densities as will be described further below with reference to FIGS. 17A and 17B).

In some implementations, an indication of the distribution of maximum and minimum distances for the structures available in the area, including the average distance between structures, can be used to determine or guide the selection of the min/max distance constraint. For example, FIG. 3 includes a display region 330 showing a 14.72 mile average distance between structures/sites. This average distance can be used to inform the choice of min/max distance, (e.g., the minimum of 3 miles and maximum of 60 miles selected via slider 320 may be selected to encompass the average distance between sites).

In some implementations, the microwave path search tool can automatically determine the min/max distances to use for radio segments for a given run scenario. For example, the tool can use statistics from the distribution of site/structure distances described above to determine the min/max distance. Given the distribution of distances, the tool may select a min/max distance that includes a certain distribution of sites (e.g., setting a min/max distance to include 70% of the available sites). The tool can also iterate through different min/max distance combinations and determine which combination yields a radio link that best meets the design objectives (e.g., which combination results in a radio link with the lowest network latency).

A user of the tool can also configure the type of height data that the tool should use when searching for the microwave paths. The type of height data to use is selected using, for example, selector 312 in FIG. 3, and can include (1) an overall best height available in the record; (2) a tip height (e.g., a height to tip of the structure including, for example, a height of lightning arrestors on the structure obtained from FAA data); (3) a structure height (e.g., height of a structure that a directional antenna can be mounted upon); or (4) a maximum centerline height (e.g., the centerline of the highest antenna mounted on the structure where each antenna is associated with a different centerline height). If an overall best height is selected, the tool can use the structure height if it exists for a particular site; if the structure height does not exist, the tool can use the tip height; if the tip height does not exist, the tool can use the maximum centerline height.

The overall best height per database source can be visualized in a user interface. For example, a display section 332 in FIG. 3 shows a distribution of overall best heights for a given database source (e.g., FCC, FAA, etc.) and indicates that the average height of the overall best heights for the given source is 151.81 ft. More specifically, each data source from which structure data is drawn may include multiple types of height data (e.g., structure height, tip height, maximum centerline height) from which an average overall best height or an overall best height histogram can be calculated or generated. When different data sources provide inconsistent site height information, the microwave path search tool can adopt different strategies to reconcile the height information. In some implementations, multiple sources may include height data for a common structure, and the tool can calculate an average overall best height for that common structure using the height data from two or more of the multiple data sources. Alternatively, the tool can default to using a shortest height from among the heights included in the multiple data sources for that common structure.

In some implementations, the average of the best height (or the median height or some statistic of the structure height in the record exclusive of outlier heights) can be used as a default height when the record associated with a site does not include any height information. Alternatively, as shown in FIG. 3, a selection box 314 can be used to specify a default height to use when no height information exists in the record for a particular site. For example, a default height with a unique or non-standard value can be used (e.g., a height of 97 ft when heights might be more likely be round units like 75 ft, 90 ft, 100 ft, etc.) that can help identify sites for which default heights are used versus sites for which actual structure heights are used in run reports.

One or more design goals or design objectives received by the microwave path search tool at block 240 (FIG. 2) can include, for example, a Fresnel zone clearance required for each segment. The required Fresnel zone clearance can be selected via selector 310 in FIG. 3, which currently shows a requirement for a first Fresnel zone clearance.

Another design goal or objective that a user of the microwave path search tool can specify is criteria associated with a least cost function employed while searching for best valid paths between sites. For example, a user can specify a distance criterion when the least cost function is based on minimizing distance to obtain the shortest path, a latency criterion if the objective is to minimize network latency, a deviation from straight criterion if the objective is to obtain the straightest geodesic trail, etc. It will be noted that the different criteria can result in the same operation of the least cost function. For example, a distance criterion resulting in the shortest path can yield the same path as a latency criterion resulting in the lowest latency or a deviation criterion resulting in the straightest geodesic route.

Other criteria defining design goals or objectives can include, for example, criteria that seeks to minimize a monetary cost of required infrastructure equipment (e.g., by targeting use of cheaper and fewer radios capable of creating reliable radio links between the segments); criteria that seeks to maximize speed or throughput (e.g., by targeting highest achievable speed or throughput of the radio link created in the radio path); criteria that seeks to maximize link reliability or link availability (e.g., by targeting sufficient fade margins to create a highest reliability link or a link with a reliability/availability above a threshold, such as above a four 9's availability (99.99%)); etc.

In the example illustrated in FIG. 3, the user interface includes a slider 370 that a user can adjust between latency and structure type. When a user adjusts the slider 370 to the right (i.e., increasing the latency percentage and decreasing the structure type percentage), the tool applies a higher contribution factor to latency components of a cost score generated for a radio path trail than the tool applies to structure type ratings that also contribute to the cost score generated for the radio path trail. In other words, a user can adjust the slider 370 to the right when the objective is to minimize network latency. Doing so would adjust the cost scores generated for each radio path and/or each radio path trail to emphasize latency ratings over other cost considerations, enabling a user to identify best radio paths and/or best radio path trails based primarily on latency. On the other hand, when a user adjusts the slider 370 to the left (i.e., decreasing the latency percentage and increasing the structure type percentage), the tool applies a higher contribution factor to structure type ratings contributing to a cost score for a radio path trail than the tool applies to latency components that also contribute to the cost score generated for the radio path trail. In other words, a user can adjust the slider 370 to the left when the objective is to simplify radio path trail construction using the best structure types, even if the resulting path may have increased latency. Thus, adjusting the slider 370 to the left adjusts the cost scores generated for each radio path and/or each radio path trail to emphasize structure type ratings over other cost considerations (e.g., latency), enabling a user to identify best radio paths and/or best radio path trails based primarily on structure type ratings. Cost scores generated for each radio path and/or radio path trail (e.g., based on latency, structure type ratings, and/or other factors) are discussed in greater detail below with reference to FIGS. 10A and 10B.

At block 250 (FIG. 2), the microwave path search tool determines a radio path trail from the first to the second geographic locations (from site A to site B of FIG. 1) that meets the design goals or objectives subject to the design constraints described above. The resulting radio path trail can traverse one of more sites in the buffer area, with each segment link or relay link along the route or trail meeting the design goals, being subject to the design constraints, and furthering the design objectives (e.g., when the design objective and least cost function criterion is minimizing latency, each segment selected can add the least amount of latency to the radio path trail). As will be described in additional detail herein, the microwave path search tool can determine the radio path trail based on the first and second information (e.g., the latitudes/longitudes of sites A and B, and heights of structures/antennas at sites A and B); the third information (e.g., constraints on the buffer area enclosing sites A and B); the fourth information (e.g., the latitudes/longitudes of the intermediate sites and heights of structures/antennas at the intermediate sites); and/or the fifth information (e.g., design constraints and design goals).

To determine a radio path trail between site A and site B, the microwave path search tool can test whether different radio paths in the buffer area between two sites at least a minimum distance away from each other and no further than a maximum distance away from each other (e.g., based on the min/max constraint received at block 240 of FIG. 2), meet the design goals (e.g., have Fresnel clearance), and have the smallest cost based on the least cost criterion (e.g., contribute the smallest additional latency). For example, starting from the first geographic location (site A), the microwave path search tool can find a first set of radio paths between site A and one or more sites in a first segment or first section or initial section of the buffer area, where each radio path in the first set of radio paths meets the one or more design goals subject to the one or more design constraints.

If no radio paths in the first segment or first section of the buffer area meet the one or more design goals (e.g., have Fresnel clearance), the microwave path search tool can expand the first segment to define a second segment or section (an expanded first segment) of the buffer area and repeat the search to identify a second set of radio paths meeting the design goals subject to the design constraints. Because the expanded first segment can include new sites, radio paths in the expanded first segment can be tested to determine if they meet the design goals.

Once one or more radio paths in the first segment or first section or initial section of the buffer area that meet the one or more design goals (e.g., have Fresnel clearance) are identified, the microwave path search tool expands the first segment or section of the buffer area to define an expanded first segment or a second segment or section of the buffer area and repeats the search to identify a second set of radio paths meeting the design goals subject to the design constraints. Processing continues in this segment-by-segment fashion until the search tool has identified one or more radio path trails, extending from site A to site B, that meet the specified design goals. Those radio paths trails are constructed from multiple segments or radio paths that each individually meet the path design goals. The total latency of the radio path trail is equivalent to the sum of each of the individual radio path latencies constituting the radio path trail, as represented by the following equation:

□□□□ □□□h□□□□□□□=Σ$_{□=0}^{□-1}$ □□□□□□(□), where i is the index of a radio path making up a radio path trail that has N radio paths, and latency (i) is the latency contribution of radio path i.

Identifying, from potentially many possible sets of radio paths, a set of radio paths that result in a radio path trail having the least cost (based on the defined least cost function) can be based on various path search algorithms, such as the A* algorithm.

The microwave path search tool can incrementally increase the search area within the buffer area with each path search iteration until all the sites within the buffer area are considered in a search iteration. In some implementations, the tool expands the buffer area to only within the maximum distance (e.g., if expanding further will only include sites beyond the max distance then the maximum buffer area expansion has been reached). If no radio path trail between site A and site B is identified when all the sites in the buffer area have been considered, the microwave path search tool can determine that there is no radio path trail that can meet the design goals or objectives subject to the design constraints. In those circumstances, in order to find an acceptable radio path trail, the user of the microwave path search tool can relax the design constraints and/or design goals (e.g., by adjusting the min/max distance, relaxing the percentage Fresnel clearance required, etc.). In some implementations, the microwave path search tool can automatically adjust various design constraints and goals, rerun the path search, and report the parameters used for identifying radio path trails meeting certain performance targets.

Because there can potentially be a large number of sites contained in the buffer area, different search area expansion methods can be utilized to speed up the analysis without compromising the probability of identifying the most optimal solution (e.g., the radio path trail that best meets the design objectives). For example, as will be described below with reference to FIGS. 6 and 7, a segmented search area expansion method can be used to incrementally expand the buffer segments at each path search iteration; as described below with reference to FIGS. 13 and 14, a linear search area expansion method can be used for the incremental expansions at each path search iteration. In some implementations, a hybrid search area expansion method using the segmented and linear approaches can be utilized to define geographic areas that the tool can search for valid radio paths to form a radio path trail.

At each search area expansion based on the different expansion methods, the microwave path search tool can compute a set of radio signal propagation path profiles between each site contained in the current search area. For example, if the first search area contains M sites, the microwave path search tool can compute M path loss profiles between site A and the M sites, considering pertinent radio propagation parameters entered or selected in the microwave path search tool (e.g., subject to the design goals and design constraints received, as described above with reference to block 240 of FIG. 2). The radio propagation parameters can include, for example, a radio frequency band, terrain and clutter in the path, types and gains of antennas that could be mounted on a structure at each site, ground elevations and structure/tower heights, desired amounts of Fresnel clearance, a relevant propagation model, among other parameters. A method of computing a path loss profile between two sites, considering radio propagation parameters, can be found in U.S. Pat. No. 10,080,144, which is hereby incorporated by reference herein in its entirety.

After computing the first set of radio path profiles between site A and each of the M sites in the first search area of the buffer area as described above, the microwave path search tool can determine which of the computed radio path profiles in the first set of radio path profiles meets the design goals (e.g., which radio path profiles meet elevation and Fresnel clearance goals). From those radio path profiles that meet the design goals, the microwave path search tool can select a subset for further consideration. For example, the selected radio paths can be those radio paths that extend the radio path trail by the largest distance towards site B compared to other radio paths that have radio path profiles that also meet the design goals. For example, a last site corresponding to the selected radio paths can be a site that is closest to site B. In addition to or in lieu of distance as the subset selection mechanism, the microwave path search tool can also determine which radio path to extend a radio path trail through based on a cost of the radio path (e.g., how much latency the radio path will add) and based on an estimate of a cost required to extend the radio path trail all the way to site B (e.g., how much latency subsequent paths emanating from the last site corresponding to the radio path will add if the radio path is selected). At each path search iteration, the microwave path search tool can determine which radio path to extend the radio path trail until the radio path trail connects site A and site B.

Segmented Buffer Expansion

Figure 6:
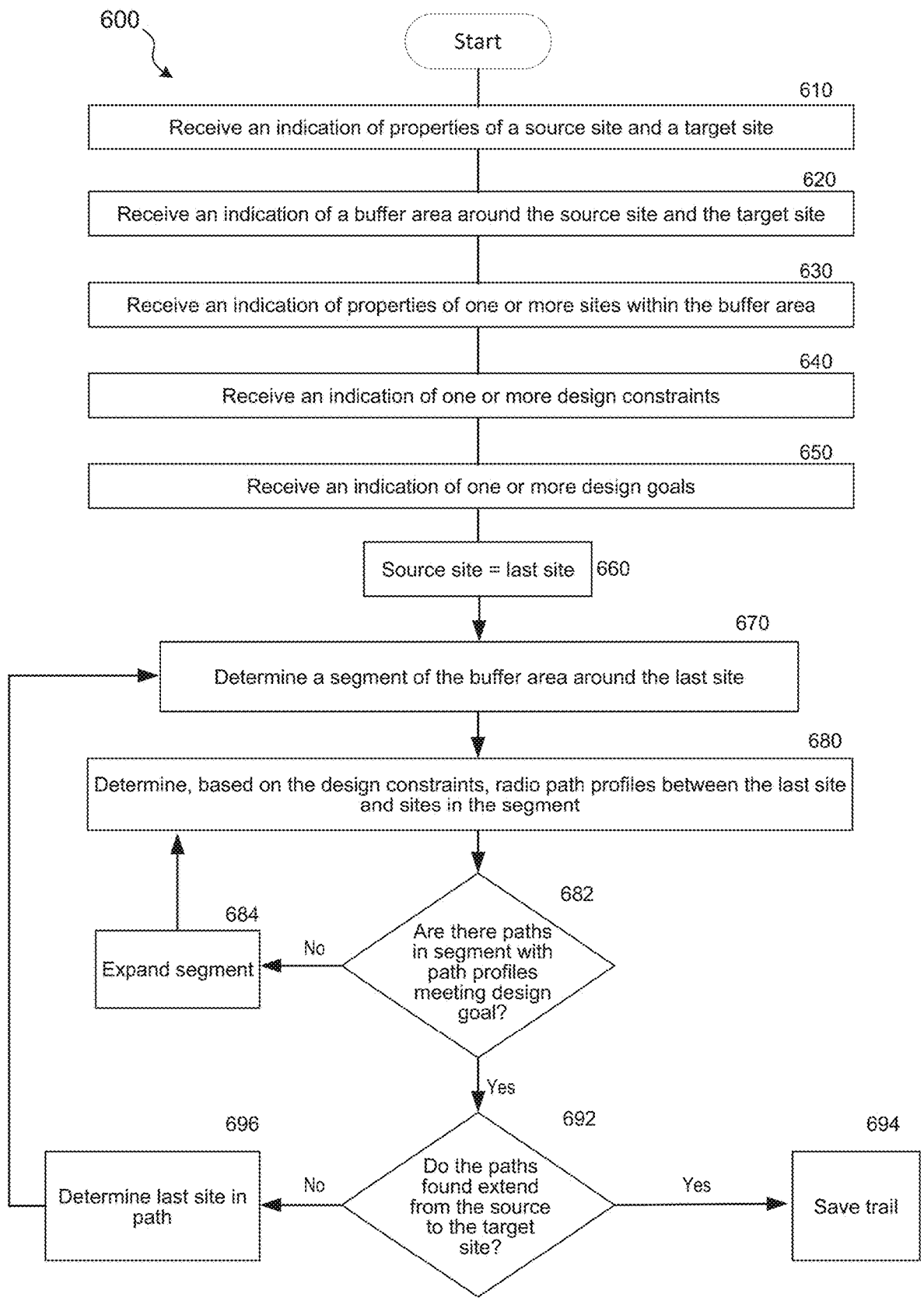
FIG. 6 is a flowchart that illustrates a first method of expanding a radio path search area within a buffer area.

FIG. 6 is a flowchart 600 that illustrates a first method implemented by the tool for expanding a microwave path search area within a buffer area to find a radio path trail between a source site at a first geographic location and a target site at a second geographic location. At block 610, the microwave path search tool receives an indication of properties of a source site and properties of a target site. At block 620, the microwave path search tool receives an indication of a buffer area enclosing the source and target sites, and at block 630 the tool receives an indication of properties of sites within the buffer area.

As described above with reference to FIG. 3, the indications of properties of source/target sites and sites in a buffer area and the indication of the bounding region and buffer area can be received through a user interface (e.g., by a user entering or selecting values in a user interface or importing a record including those properties). The properties of the source/target sites and sites in the buffer area can include, for each site, latitude and longitude coordinates (e.g., GPS coordinates of the site), an identifier of a structure at the site (e.g., a tower name or tower identifier), and a height of the structure (e.g., a tip height, structure height, or centerline height(s)). The indication of the buffer area can be received as described above with reference to FIG. 3 and can include bounding regions similar to those described above with reference to FIGS. 4A and 4B.

At block 640, the microwave path search tool receives design constraints constraining certain properties of microwave paths identified between sites. For example, as described above, a design constraint could include a maximum and minimum distance between two contiguous sites of a radio path trail (e.g., radio path trail(s) identified by the tool cannot have segments or intermediate links or relay links or radio paths having a distance less than the minimum distance or greater than the maximum distance). Other design constraints can include the type of height used in the analysis, the K-factor, clutter/terrain/tree-height constraints, etc.

At block 650, the microwave path search tool receives design goals. For example, as described above, a design goal can include the Fresnel zone clearance required for radio paths between sites, and/or a least cost criterion to use when identifying potential best routes or radio paths to form the radio path trail between the source site and the target site. The design goal can be defined between site pairs or as an overall goal for the resulting radio path trail. For example, a site goal could be to identify a radio path trail with a minimum latency (or latency below a target threshold latency), or to find the N radio path trails with lowest latency (e.g., 10 best radio path trails with the lowest latency).

At block 660, the microwave path search tool determines the starting site for the path/trail search. For example, if this is the first run or iteration then the first site will be the source site (which would also be the last site because no other sites would have been considered as intermediate path termination points). As will be described in further detail herein, if a path search within a certain portion of the buffer area does not yield a radio path trail that extends from the source site to the target site (e.g., because of constraints on min/max distance or because there are not enough sites in the search area or because found radio paths do not meet design goals), then the last site (e.g., the site closest to the target site) is used as the starting site for the next search iteration.

At block 670, the microwave path search tool determines a segment or section of the buffer area around the last site. For example, the tool can determine an area around the last site where a radio path trail terminated in a previous search iteration or, if this is the first search iteration, an area around the source site.

In some implementations, the first/initial segment area of the buffer area can include a first area defined by a first radial distance around the last site (or around the source site for the first search iteration), and a second area defined by a second distance from a line connecting the last site (or source site) and the target site. The second area can be further constrained or defined by the maximum distance design constraint received at block 640.

Figure 7:
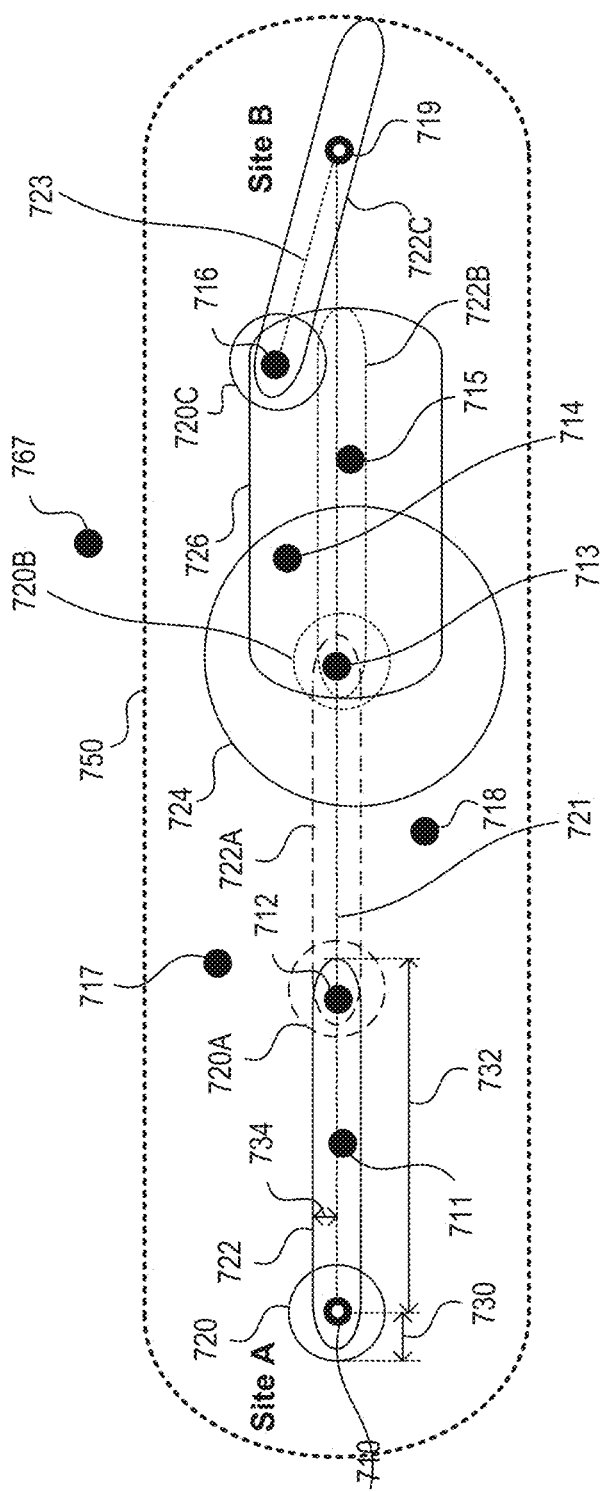
FIG. 7 is a block diagram that illustrates the first method of expanding the microwave path search area.

Referring to FIG. 7 as a specific example, a block diagram is shown illustrating the first method of expanding the microwave path search area. A first segment area within buffer area 750 can be defined by the circular region 720 around the source site 710 (site A), where the circular region 720 has a radius 730. Additionally, or alternatively, the first segment area can be defined by the elliptical region 722 defined by a distance 734 from the line 721 connecting the source site 710 (site A) and the target site 719 (site B). The elliptical region 722 can have a length that is based on the maximum distance constraint received at block 640. For example, in some implementations, the length 732 between the source site and the extent of the elliptical region can be the maximum distance constraint, the length of the furthest points of region 722 can be the maximum distance constraint, or the combined radius 730 and length 732 can be the maximum distance constraint. Constraining the first segment area to the maximum distance constraint prevents identifying sites for radio paths that are further away from the source site 710 than the maximum distance constraint would allow. In some implementations, the first segment area is also constrained by a minimum distance constraint (e.g., a largest dimension of the segment area is at least larger than the minimum distance) to avoid identifying only sites that are not at least the minimum distance constraint away from the source site (site A).

Referring again to FIG. 6, at block 680, the microwave path search tool determines radio path profiles between the last site (or source site for the first search iteration) and the sites in the segment area determined at block 670. The tool can determine a set of radio path profiles between the last site based on the properties received at blocks 610 and 630, and further based on the design constraints received at block 640 (e.g., based on the latitude/longitude and structure heights at the source site and sites in the first segment, based on the K-factor, based on the terrain and clutter data within the first segment, based on min/max distance—excluding sites not within min/max distance, etc.).

At block 682, the microwave path search tool determines if there are any radio paths traversing sites in the first segment where the path profiles determined at block 680 meet the design goals received at block 650. For example, the tool can determine first if there are any sites within the first segment (if there are no sites, then no paths can be formed so the tool expands the first/initial segment to define a second/expanded segment as described further below). If there are sites with the first segment, the tool can determine whether the path profiles for sites considered in the segment also meet certain required design goals (e.g., whether the sites meet clearance). The radio paths not meeting designs goals are excluded from consideration when finding paths to form a radio trail between the source and target sites. If no valid/passing radio paths exist in the first segment, the tool expands the first segment as described below with reference to block 684.

FIG. 7 can be used to further explain blocks 680 and 682. For example, at block 680, the tool can compute a set of radio path profiles between the source site 710 (site A) in FIG. 7, and the intermediate sites 711 and 712 in the first segment area defined by regions 720 and 722 (e.g., a first set of radio path profiles including a first path profile from source site 710 to intermediate site 711, a second path profile from source site 710 to intermediate site 712, and a third path profile from intermediate site 711 to intermediate site

712, where the inter-site distances are within a min/max distance). At block 682, the tool can determine if any of these path profiles do not meet the design goal and exclude those paths with path profiles not meeting the design goal (e.g., excluding paths if there is no clearance between sites).

Although only two intermediate sites are shown in the first segment in the example of FIG. 7, there can be many (e.g., tens or hundreds) of intermediate sites within the first segment which can determine the area of the first segment to ease the computation at blocks 680 and 682.

The choice of which radio paths with path profiles meeting the design goal to use as potential radio paths making up a radio path trail can be based further on the design goal received at block 650. For example, the microwave path search tool can start from the source site 710 and find a set of paths in the first segment having the smallest cost of the least cost function criteria (e.g., shortest radio path distance, lowest latency, fastest data throughput, etc.). The tool can evaluate the path between site 710 and 711 against the path between site 710 and 712 and determine which path has the least cost (where both paths meet clearance and are within min/max distance from the source site). If, for example, the tool determines that the path from 710 to 712 is not possible but the path from 710 to 711 is possible, the tool determines what the next path from 711 would be based on the design constraints and goals. For radio paths adding the same cost to the trail, the tool can determine which path to select based on the cost added by subsequent paths extending from each of the paths under consideration.

At block 692 of FIG. 6, the microwave path search tool determines if any of the radio paths found at block 682 extend the radio path trail from the source site to the target site. If a complete radio path trail has been identified, the tool at block 694 can save the radio path trail or the N best radio path trails (e.g., the N radio path trails that best meet the design goal). When a complete radio path trail has been found, the last site is the target site.

Conversely, if a complete radio path trail has not yet been found, the tool can determine at block 696 what is the last site of the current best partial radio path trail (or the last sites in the current best partial radio path trails when the tool is configured to search for the N best radio path trails). The last site can be the site that is closest to the target site compared to the other sites in the partial radio path trail (e.g., the site with a smaller distance to the target site than other sites in the set of radio paths making up the current best partial radio path trail).

For example, referring again to FIG. 7, for a first set of radio paths in the first segment, including a first radio path from site 710 to site 711, and second radio path from site 711 to site 712, the tool can determine that the last site is site 712 because site 712 is closer to the target site 719 than site 711. The tool can use site 712 as the starting point for the next path search iteration by determining at block 670 a new segment of the buffer area around this last site (e.g., a segment approximately equal in area to the first segment defined by regions 720A and 722A in FIG. 7); determining at block 680 radio path profiles between this last site and intermediates sites in the new segment; determining at block 682 if the path profiles meet the design goal; and, determining at block 692 whether complete radio path trails between source and target sites have been found.

Referring back to block 682 of FIG. 6, if the microwave path search tool determines that there are no sites bounded by the first/initial segment area, or that there are sites in the first segment but the radio paths formed by those sites have path profiles that do not meet the design goals (e.g., no clearance), the tool can, at block 684, expand the first segment to define an expanded first segment or a second segment around the last site (or around the source site if no partial radio path trails or radio paths have been identified). The area of the expanded first segment is larger than the area of the first segment to add more sites to the search area but is still within the buffer area (e.g., if portions of the expanded first segment extend outside the buffer area, those sites within the expanded first segment but outside the buffer area, such as site 767 in FIG. 7, are excluded from consideration when the tool is evaluating radio paths for the radio path trail).

After the segment expansion at block 684, the microwave path search tool can determine at block 680 radio path profiles between the last site (or source site) and intermediates sites in the expanded segment; determine at block 682 if the path profiles in the expanded segment meet the design goal; and, determine at block 692 whether the set of radio paths identified in the expanded segment, when combined with the set of radio paths from previous iterations, define a complete radio path trail between the source site and the target site. If a complete radio path trail has been found, the trail is saved, and if no complete radio path trail has been identified, the trail search continues starting from the last site identified in the expanded segment, as described above.

For example, referring again to FIG. 7, if the current best partial radio path trail traverses sites 710, 711, 712, and 713 (in that order), and the current last site is identified as site 713, site 713 is used as the starting point for the next path search iteration. The tool at block 670 (FIG. 6) defines the first segment around site 713 as regions 720B and 722B, and determines if there are sites within this first segment and if those sites meet the design goals. If for example, site 715 is the only site within this segment, but the radio path profile between site 713 and site 715 does not meet the design goal (e.g., no clearance), the tool at block 684 can expand the first segment to encompass a larger area contained within an expanded or second segment defined by regions 724 and 726. For example, the tool can approximately double the first radial distance around site 713 (or otherwise define a circular region 724 around site 713 enclosing twice the area enclosed in the first segment region 720B), and approximately double the second distance from the line connecting the site 713 and the target site (e.g., increase the area enclosed by region 722B to define region 726 having twice the area). In some implementations, the tool can increase the first radial distance to the extent that the corresponding expanded segment region encloses some sites within the max distance.

In some implementations, different spatial expansions gradients can be used around the last site, for example, where the circular region around the site 713 can be expanded by a larger extent than the segment area towards the target site 719 (e.g., to bias the search towards finding more sites in the expanded segment closer to site 713).

Additionally, in some implementations, different expansion rates can be used for successive search iterations. For example, the expansion rate can be decreased or increased with each subsequent expansion for the same search iteration (e.g., decreasing the expansion rate can limit the number of additional sites included in the search iteration).

After expanding the segment, the tool can identify sites 714 and 716 within the expanded segment and determine a new set of radio paths with path profiles meeting design goals. For example, the tool can identify a first ordered set of radio paths traversing sites 713→714→716, a second ordered set traversing sites 713→714→715→716, and a third ordered set of radio paths traversing sites 713>716. The path traversing sites 713→715→716 would not be a valid path where the path profile between site 713 and 715 does not meet the design goals. Because none of these valid paths, when combined with path 710→711→712→713 from the previous iterations, form a complete radio path trail from the source site 710 (site A) to the target site 719 (site B), the tool determines what is the last site (e.g., site 716) in the set of radio paths and resumes the path search from there with a new search area segment.

As described above, which path in the ordered set of radio paths the tool identifies as the current best path can depend on which set of paths best meets the design goal (e.g., shortest path, straightest path, lowest latency, has clearance, etc.), subject to the design constraints (e.g., paths within min/max distance, clearance considers terrain and clutter, etc.). For example, paths traversing sites 713→714→716 can be excluded if the distance between sites 713 and 714 is less than the minimum distance constraint. If the distance between sites 713 and 716 was larger than the maximum distance constraint, the design tool would expand the segment further to include sites 717 and 718 (and perhaps even sites 712, 711) until valid paths terminating at site 716 could be identified, if any.

With the last site from the last path search iteration identified as site 716, the design tool can define a new search area segment around site 716, where the new search area (new segment) includes a region 720C and a region 722C (e.g., a path search area approximately equal to the first/initial segment area in some implementations and with the region 722C oriented towards the target site 719 as shown in FIG. 7 where region 722C can be centered around line 723 connecting site 716 to the target site 719).

With the new last site being the target site 719 (at site B), a complete radio path trail can be defined by the ordered set of paths traversing sites 710→711→712 from the first search iteration, sites 712→713 from the second search iteration, sites 713→714→716 from the third search iteration, and sites 716→719 from the last search iteration.

In some implementations, the microwave path search tool can determine several complete radio path trails or routes from a source site to a target site, with each trail having at least one radio path segment that is different from other trails (e.g., a different combination of sites or a different permutation of the same sites).

In some implementations, the tool can determine all the path profiles between mutual sites in the buffer area (e.g., from each site to all other sites in the buffer area) so that the tool need not perform this computation at each segment expansion.

The microwave path search tool can use various informed search algorithms (e.g., an A* search algorithm) to find the least cost paths within the expansion segments.

FIGS. 8A, 8B, 8C, and 8D are block diagrams illustrating example expansions of the microwave path search area according to the first method. For example, the microwave path search tool, when trying to find best radio path trails between source site "S" 810 and target site "T" 819 in FIG. 8A, can determine a valid set of radio paths traversing sites 820, 830, 840, and 850 in that order (labeled sites 1, 2, 3, and 4, respectively in FIG. 8A).

Figure 8A:
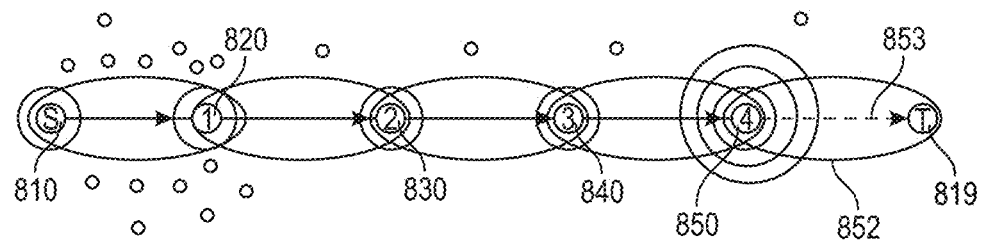
FIGS. 8A, 8B, 8C, and 8D are block diagrams illustrating example expansions of the microwave path search area according to the first method.

In the example of FIG. 8A, however, the microwave path search tool can determine that path 853 between site 850 and target site 819 does not meet the design goal (e.g., has no clearance). Or site 819 is not within a min/max distance of site 850 rendering the path 853 within the segment area that includes area 852 not valid. The failure of path 853 to meet the design goals is represented by a dashed line in FIG. 8A.

Figure 8B:
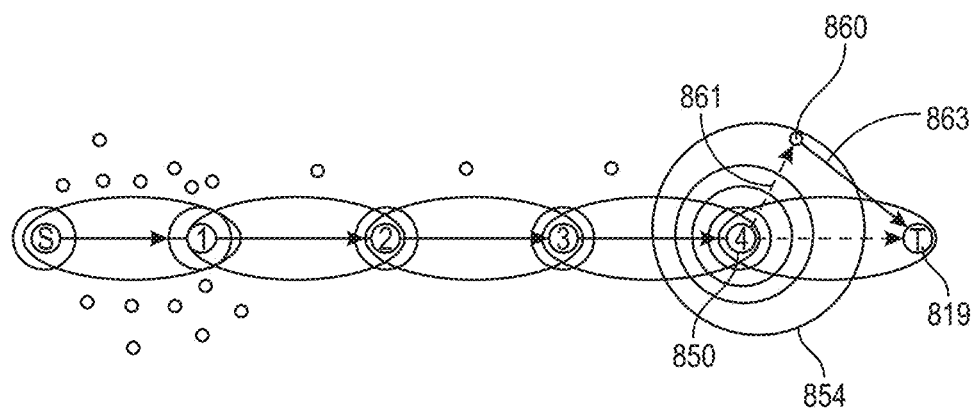

In FIG. 8B, the microwave path search tool can expand the search area 852 (depicted in FIG. 8A) recursively until an expanded search area 854 includes area 852 and also encloses site 860. If the tool determines that the path 863 between site 860 and the target site 819 has coverage, the tool can test what paths connecting from site 850 to site 860 have coverage as well (e.g., meeting the design goal).

Figure 8C:
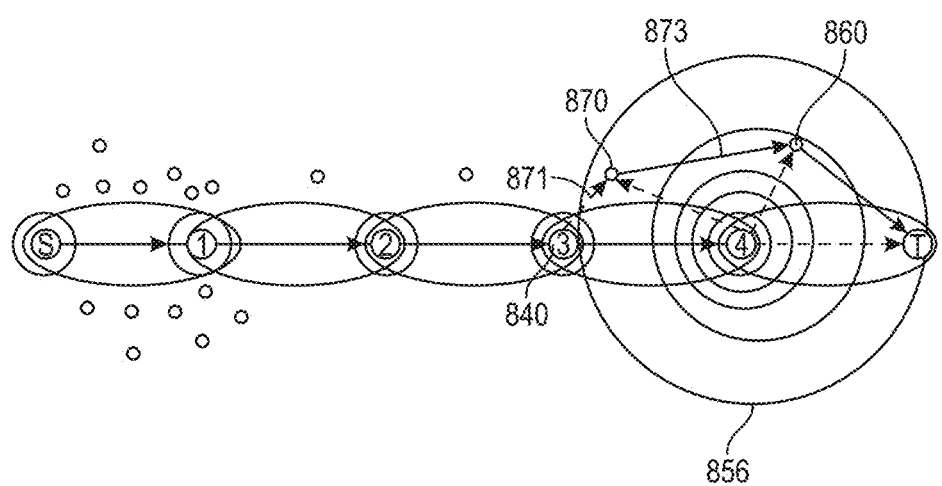

If, as shown in FIG. 8B, path 861 between sites 850 and 860 does not have clearance (as shown by the dashed line in FIG. 8B), the tool can continue to expand the search area 854 to a further expanded search area 856 enclosing site 870, as shown in FIG. 8C.

If path 873 between sites 870 and 860 has clearance (as shown by the solid line connecting those sites in FIG. 8C), the tool can search for paths terminating at site 870 that have clearance (e.g., meet design goals subject to design constraints). If path 871 between site 840 and 870 does not have clearance (as shown by the dashed line in FIG. 8C), the tool would continue to expand the search area 856 to a search area 858, as shown in FIG. 8D.

Figure 8D:
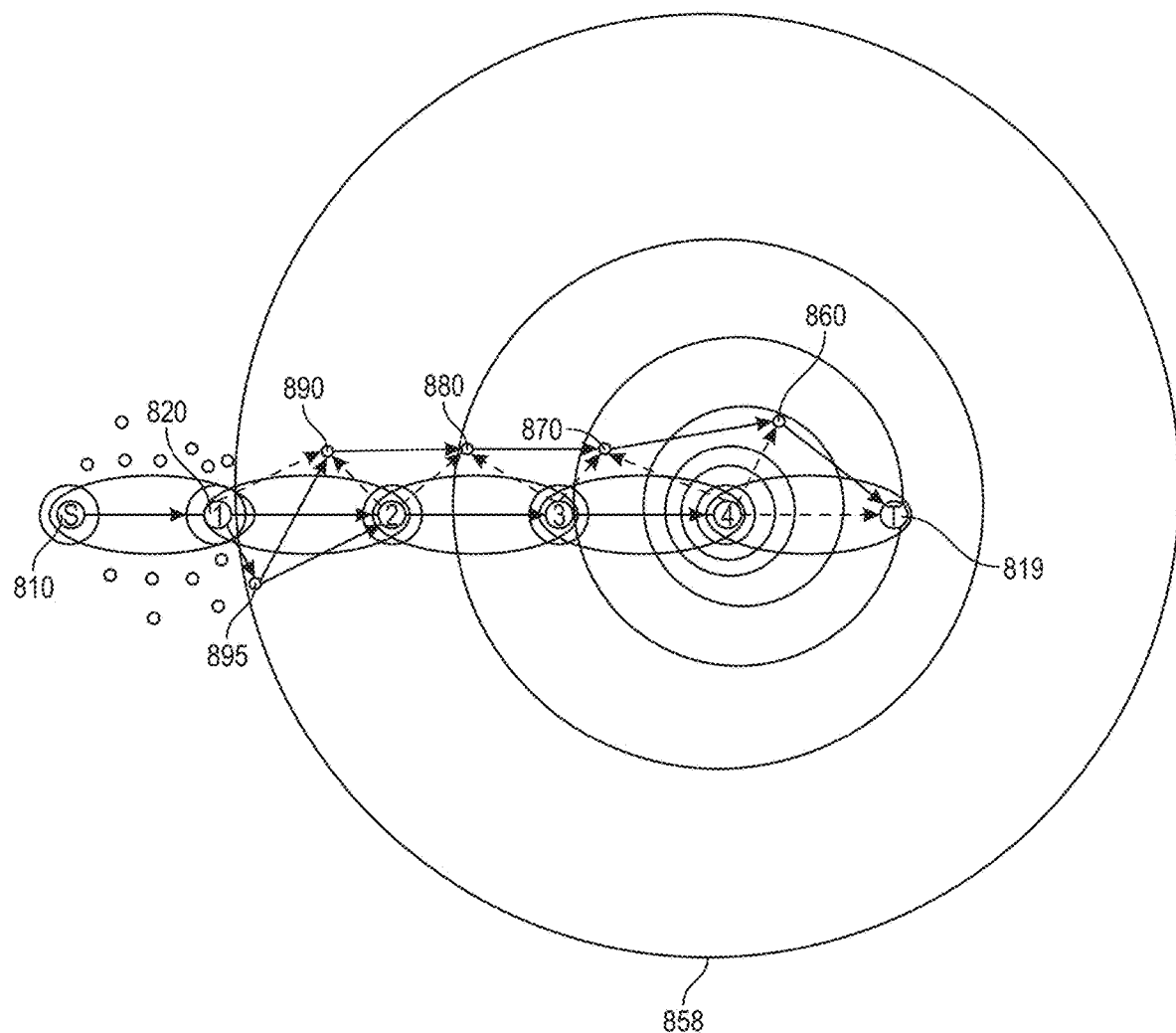

In FIG. 8D, the microwave search tool has found a complete radio path trail that meets the desired design goals with radio paths traversing sites 810→820→895→890→880→870→860→819 in that order.

In some implementations, the expansions of the search area around the current last site can be non-uniform. For example, as shown in the example expansions of FIGS. 8A-8D, the circular portion around the site is expanded faster than the linear segment extended from the site in the direction of the target site (e.g., area 852 in FIG. 8A is not expanded or is expanded slower than the expansions of areas 854, 856, 858).

Figure 9A:
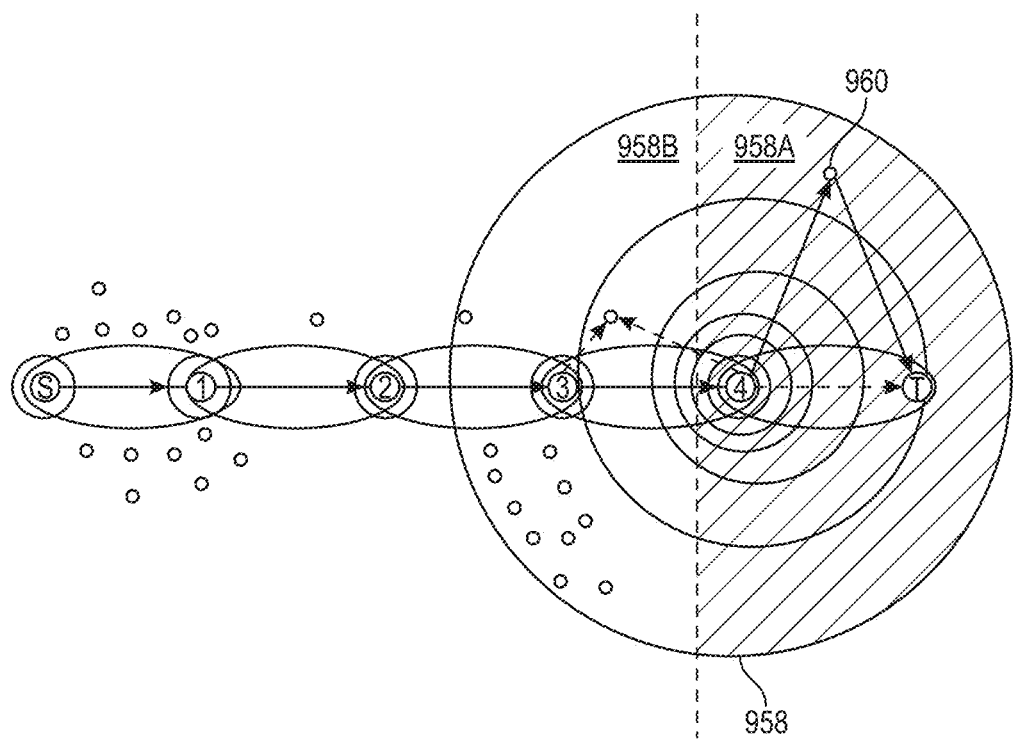
FIGS. 9A and 9B are block diagrams illustrating an example method for evaluating sites within an expansion area.
Figure 9B:
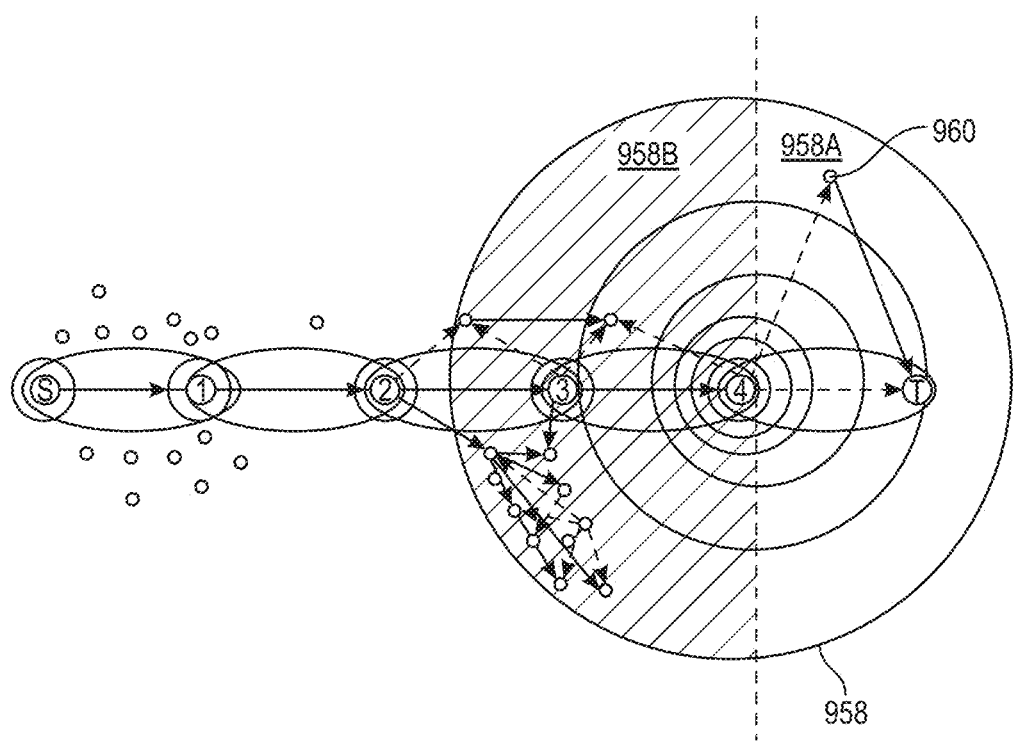

FIGS. 9A and 9B are diagrams illustrating an example method for evaluating sites within an expansion area or search segment. In the example illustrated in FIG. 9A, the microwave path search tool first evaluates sites within portion 958A of the circular expansion area 958 before evaluating sites within portion 958B of the expansion area 958. By dividing the search region into portions 958A and 958B, the tool is able to reduce the computational burden of evaluating all sites within the circular expansion area 958 at once. As shown by the solid lines in FIG. 9A, while evaluating sites in the portion 958A, the microwave path search tool identifies two cleared paths: one from site 4 to site 960, and one from site 960 to site T. The path from site 960 to site T is therefore added to a collection of cleared paths that reach site T.

In FIG. 9B, the microwave path search tool considers only those sites within the portion 958B and identifies all radio signal path segments the meet the specified design goals. Because site 960 is not included within the portion 958B, the radio path segment from site 4 to site 960 is not considered and is therefore left in broken lines in FIG. 9B. The microwave path search tool identifies multiple cleared paths (shown in solid lines in FIG. 9B) while evaluating the sites within the portion 958B, but none of the cleared paths reach site T. Therefore, none of cleared paths from the evaluation of the sites within the portion 958B are added to the collection of cleared paths that reach site T.

After evaluating the sites within the portion 958A and 958B and obtaining a collection of cleared paths that reach site T, the microwave path search tool can analyze the collection of cleared paths to determine a best radio path trail from S to T. Here, the microwave search path tool can identify that the best radio path trail from S to T as site S→1→2→3→4→960→T, in that order.

Paths and Trails

Figure 10A:
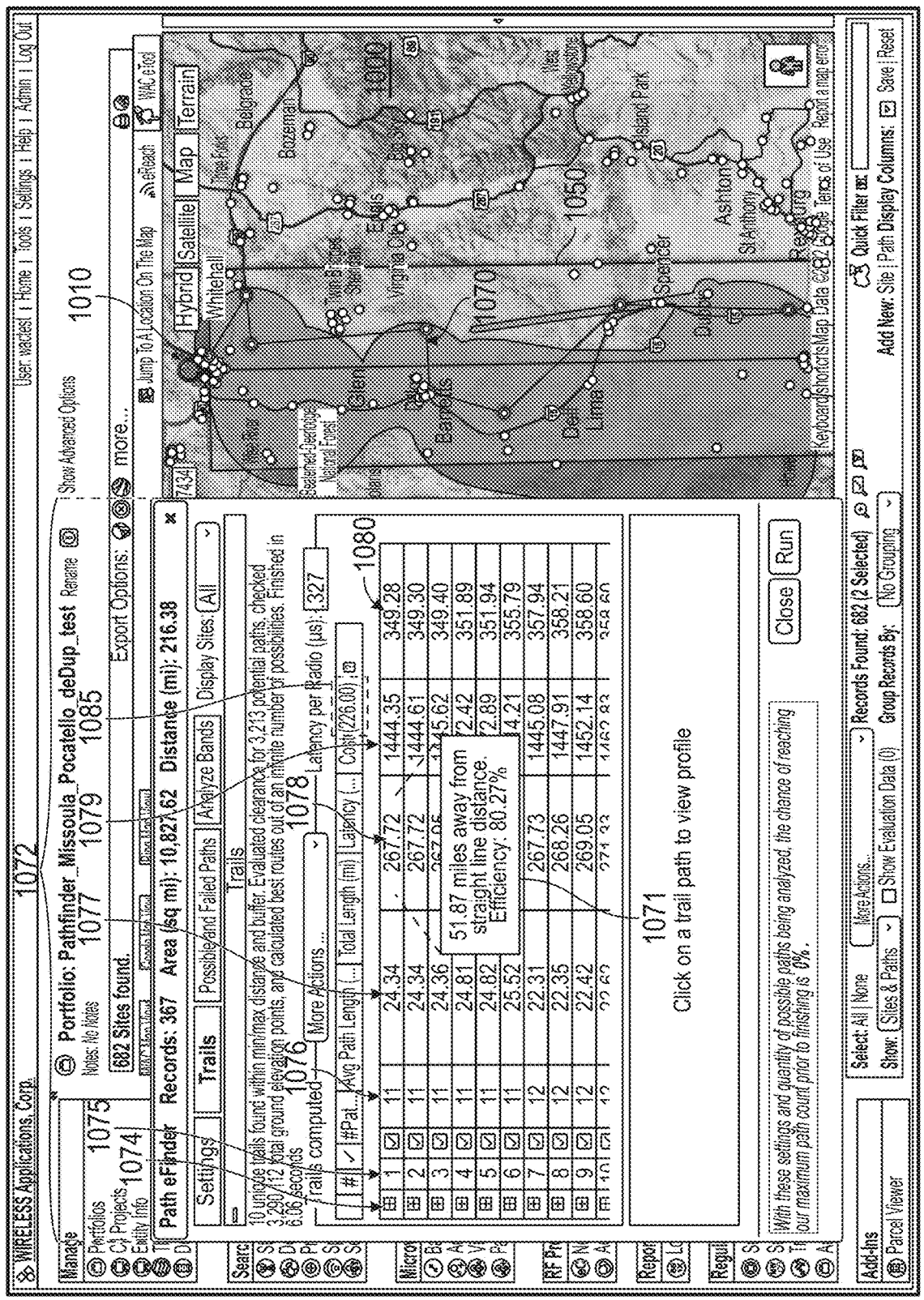
FIGS. 10A and 10B are example user interfaces to display radio path trails and radio paths.

FIG. 10A is an example user interface generated by the tool to display radio path trails and radio paths (e.g., the trails and paths identified and discussed with reference to FIGS. 6 and 7 above). For example, the user interface display 1072 shows a number of radio path trails in column 1075 (showing 10 trails) and a number of radio paths corresponding to each trail in column 1076 (e.g., trail #1 includes 11 paths, trail #7 includes 12 paths, etc.). Display 1072 can also show details related to the trails. For example, trail #1 has an average path length of 24.34 miles (shown in column 1077), has a total length of 267.72 miles (shown in column 1078), and has a total latency of 1444.35 µs (shown in column 1079). Additional information can include, for example, how close the trail is to a perfect design goal (e.g., latency relative to an ideal free space latency). A display section 1071 shows that trail #1 is 51.87 miles away from a straight line distance between the source and target site, or has an 80.27% efficiency or degradation from the ideal straight line latency. Display 1072 can also be used to capture additional information, such as the additional latency to apply to each site to account for the radio latency (e.g., shown as 0.327 µs in display 1072).

The user interface display 1072 of FIG. 10A also shows a cost score generated for each of the identified radio path trails in column 1080. As discussed above with reference to FIG. 3, a cost score generated for a radio path trail (and/or for radio paths constituting the radio path trail) can be based on one or more least cost criterions specified by a user. In the illustrated example, the cost scores illustrated in column 1080 are based on latency of radio paths forming a corresponding radio path trail and on structure type ratings corresponding to structures at each of the sites utilized to form the corresponding radio path trail. More specifically, an overall or aggregate latency of a radio path trail typically increases as the number of radio paths constituting the radio path trail increases. In contrast, an overall or aggregate structure type rating (e.g., based on individual structure type ratings corresponding to structures at each of the sites utilized to form the radio path trail) can increase or decrease as the number of radio paths constituting the radio path trail increases, depending on the particular structures added to the radio path trail. The cost score of a radio path trail is therefore often positively correlated with the overall latency and negatively correlated with the overall structure type rating. Thus, as the overall latency of a radio path trail increases and the overall structure type rating of the radio path trail decreases, the cost score assigned to the radio path trail increases. Relative weightings applied by the tool to the overall latency (or to individual latency components used to calculate the overall latency) and the overall structure type rating (or to individual structure type ratings used to calculate the overall structure type rating) to generate a cost score for a radio path trail can be adjusted, for example, using the slider 370 of FIG. 3. Therefore, by comparing cost scores radio path trails to one another, a user can identify a least costly radio path trail based on one or more least cost criterions specified by the user.

Figure 10B:
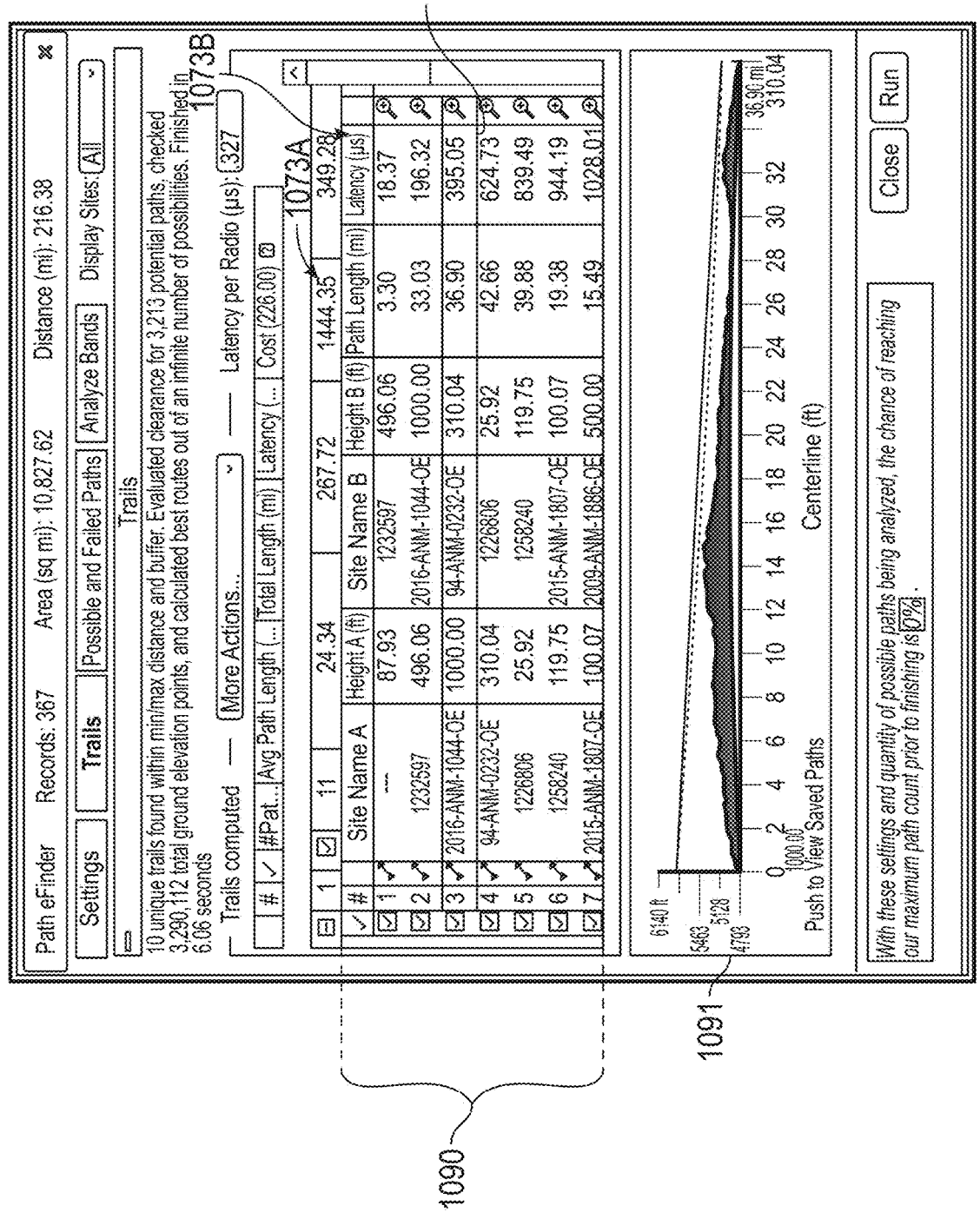

In addition, the user interface display 1072 of FIG. 10A can show a cost score 1085 corresponding to an optimal case. In some embodiments, the optimal case can be defined as a radio path trail that includes only one radio path extending between a source site and a target site that each include a structure type having a maximum possible structure type rating. Thus, a cost score of a radio path trail illustrated in column 1080 can be compared to the cost score 1085 corresponding to the optimal case to provide an indication of the quality of the radio path trail based on one or more least cost criterions specified by a user. The radio paths constituting a radio path trail can be visualized in a display map 1000 overlaying the sites within a buffer area 1050 (e.g., radio path trail 1070 originating from source site 1010). Further details related to a radio path trail can be viewed using, for example, a drill-down button 1074 in the display 1072 (FIG. 10A). For example, selecting the drill-down button 1074 can display a display section 1090 (FIG. 10B) that presents different properties of the radio paths making up the radio path trail. For example, an identifier of each of the utilized intermediate sites in the buffer area 1050 (FIG. 10A), antenna heights, path lengths, and latency added by each radio path segment can be displayed in the display section 1090. FIG. 10B shows a value 1073A of total latency in radio path trail #1 as 1444.35 µs, and shows in column 1073B how much latency each segment or radio path in radio path trail #1 contributed to the total latency. For example, the third segment from site "2016-ANM-1044-OE" to a site named "94-ANM-2032-OE" contributes 395.05 µs of latency to the total latency of the radio path trail #1. When presented with the latency of each link in the radio path trail, a network design engineer can focus their analysis on link segments having particularly high or unexpected latency values in order to potentially reduce the overall radio path trail latency.

A path profile between two sites utilized to form the radio path trail (e.g., the clutter and clearance between the sites in row 1092) can be visualized in a path profile display section 1091.

Figure 11A:
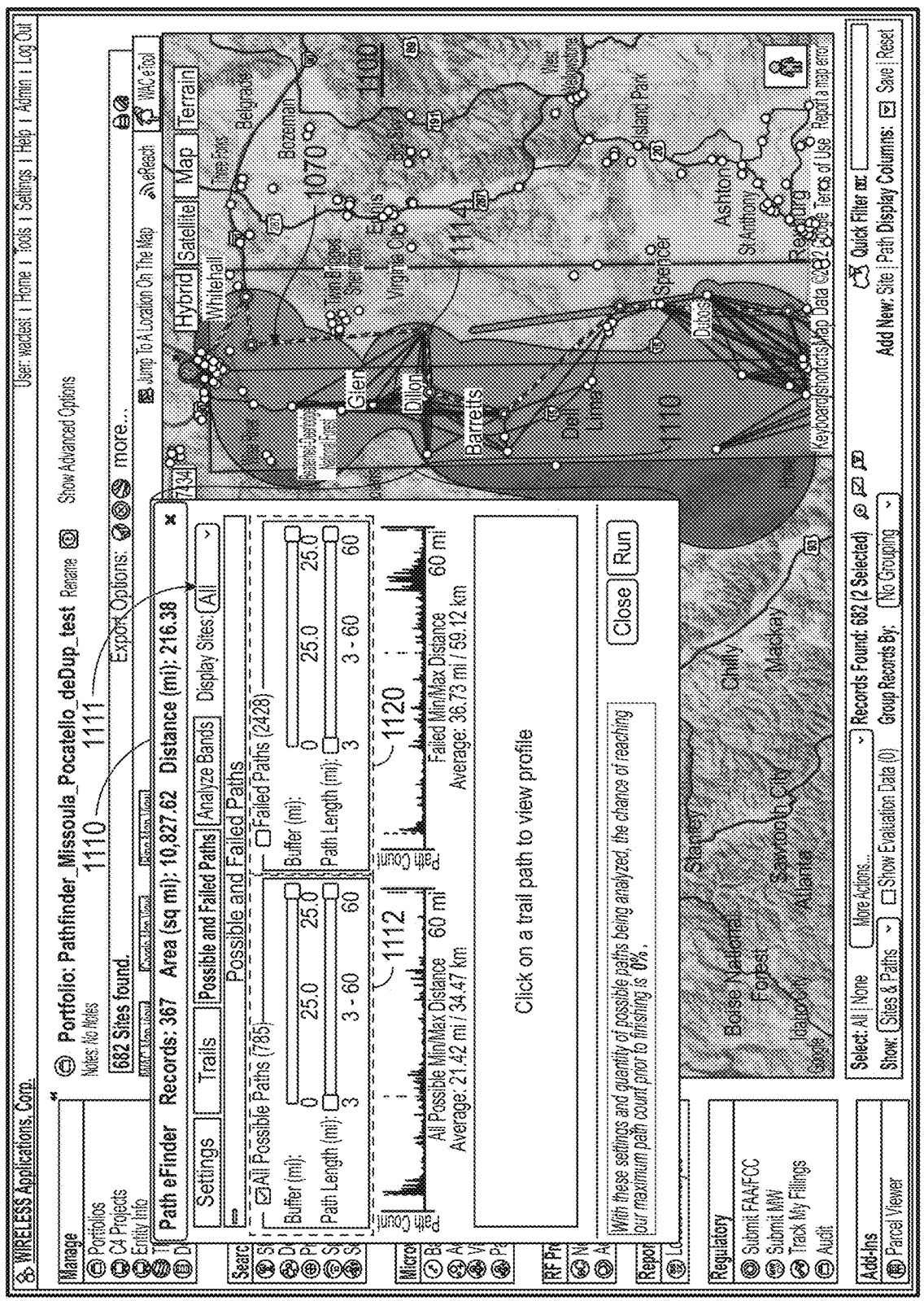
FIG. 11A is an example of possible radio paths considered for a radio path trail of FIGS. 10A and 10B.

FIG. 11A shows an example of possible radio paths considered for the radio path trail 1070 of FIGS. 10A and 10B. For example, a display 1110 can include a first display section 1112 for selecting all possible radio paths considered that meet certain criteria (e.g., as shown in section 1112, all possible paths with a 25 mile buffer area and/or all possible paths with path lengths between 3 miles and 60 miles). The possible paths can be grouped in lines (e.g., lines 1114) and overlaid on a map area 1100 that also displays the identified radio path trail (e.g., trail 1070).

The display 1110 can also include a second display section 1120 for selecting all failed radio paths that meet certain criteria. In the example of FIG. 11A, the display 1110 shows that 3,213 radio paths were run by the tool, resulting in the identification of 785 possible paths that were deemed successful, and 2,428 failed paths. As shown in FIG. 10A, a trail with 11 of the 785 possible paths (trail #1) was determined to best meet the lowest cost design goal. Other radio path trails having 11 or 12 radio paths also met the design goals, but with higher overall latency or cost, as a result of the other routing.

In some implementations, the tool can display a radio path trail, and display radio paths within the buffer area (e.g., radio paths constituting the trail, possible paths, and failed paths), with different visual treatments. For example, a radio path that meets the design goals subject to the design constraints (e.g., has clearance and is within min/max distance) can be displayed with a visual treatment that is different from the visual treatment of a radio path that does not meet the one or more design goals (e.g., blocked paths or paths not within the min/max distance constraint).

Figure 11C:
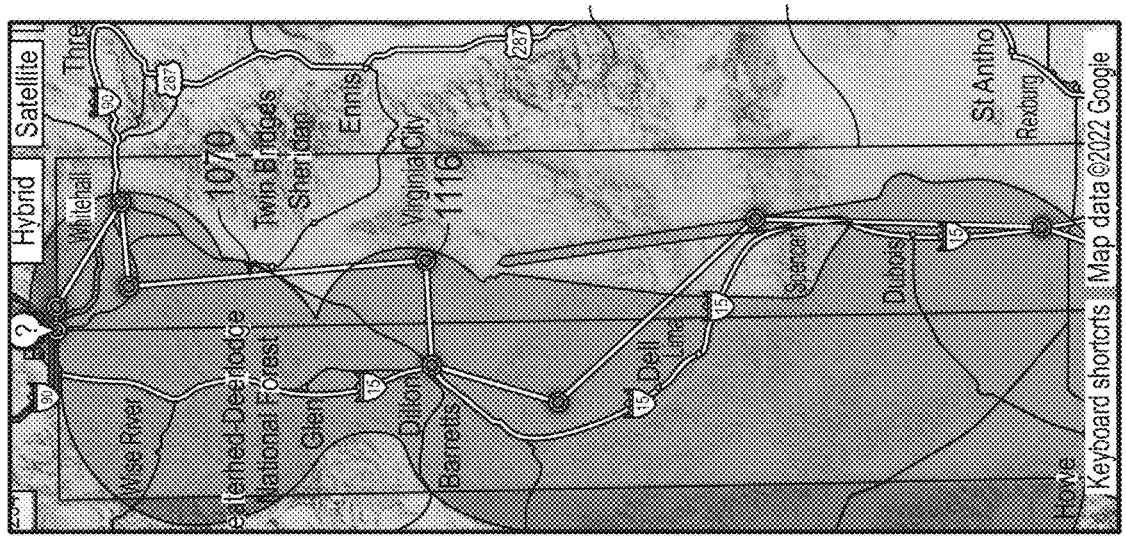
FIGS. 11B and 11C show example displays of the radio path trail of FIGS. 10A and 10B.
Figure 11B:
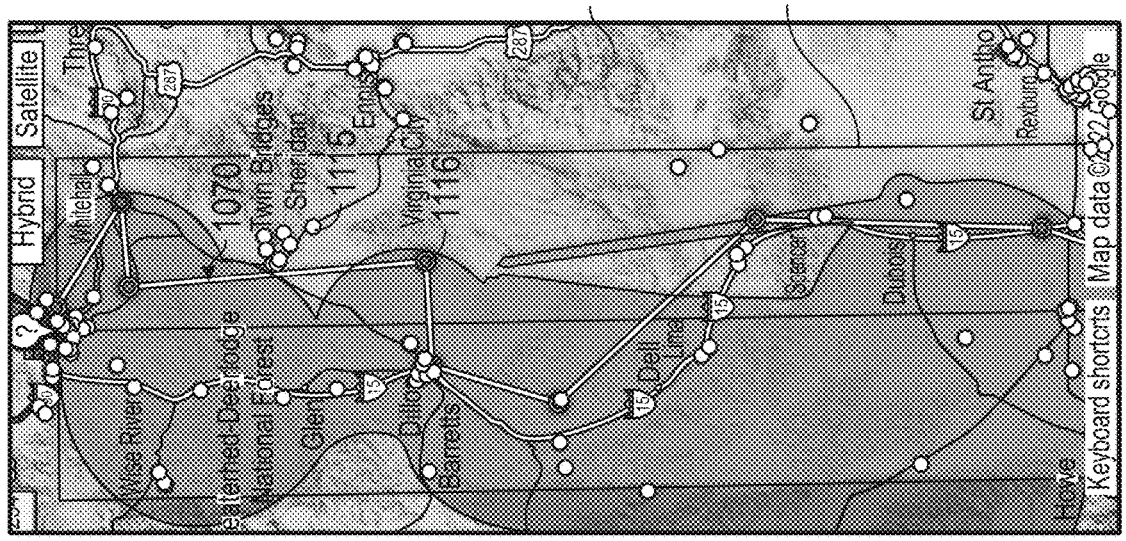

FIGS. 11B and 11C show example displays of the radio path trail 1070 represented in FIGS. 10A and 10B. For example, FIG. 11B shows all the sites in the map area 1100 (including all the sites in the buffer area 1050) when a "Display Sites" option (e.g., using drop-down control 1111 of FIG. 11A) is set to show all the sites. Larger dots illustrated in the map area 1100 indicate a cluster of multiple sites within a given distance of one another at the location the larger dots are depicted. If a user of the tool were to operate a zoom control to change the depicted scale of the radio path trail, the tool can group sites into a greater or lesser number of depicted sites. For example, a user zooming in (i.e., making the depicted scale smaller) will cause the tool user interface to break larger dots into constituent individual dots that reflect single sites or a smaller number of sites. In contrast, a user zooming out (i.e., making the depicted scale larger) will cause the tool user interface to group clusters of single sites or smaller number of sites into a single larger dot on the interface.

Conversely, FIG. 11C shows only the sites that are used for the selected radio path trail. For example, in FIG. 11B, both site 1116 that is used for the radio path trail 1070 and site 1115 that is not used for the trail are displayed in map area 1100, but site 1116 is displayed in FIG. 11C while site 1115 is not.

Figure 12A:
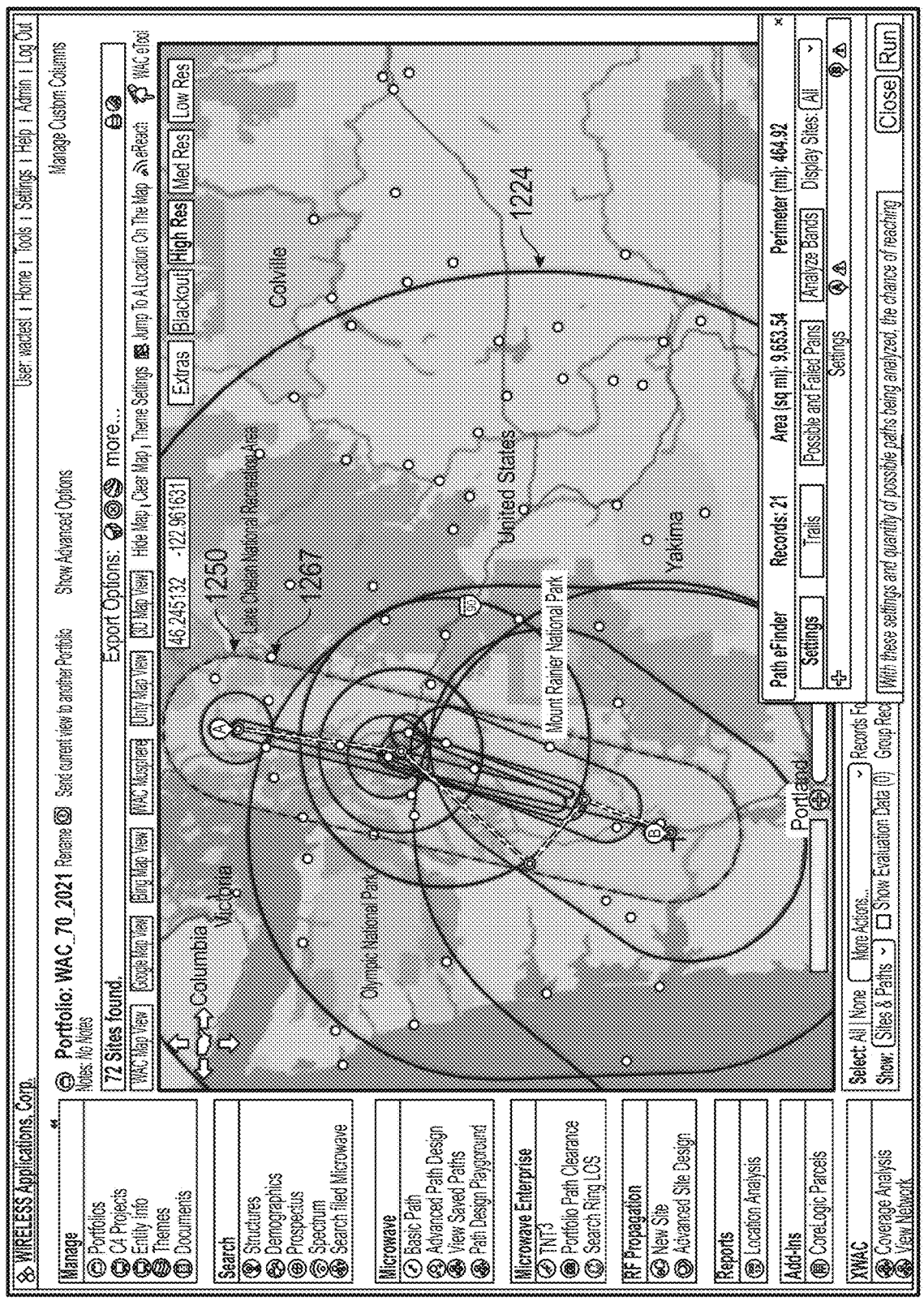
FIG. 12A shows a first example of segment buffer expansions.

FIG. 12A shows a first example of segment buffer expansions where there are few sites within buffer area 1250 (and/or difficult terrain or clutter in the buffer area) thereby requiring wide segment expansions for each path search iteration and possibly resulting in a slow search progression. For example, segment expansion 1224 has been expanded to encompass the buffer area 1250. However, as described above with reference to FIG. 7, sites within the segment expansion 1224 but outside the buffer area 1250 (e.g., site 1267) will not be considered as candidate sites for the radio path trail.

Figure 12B:
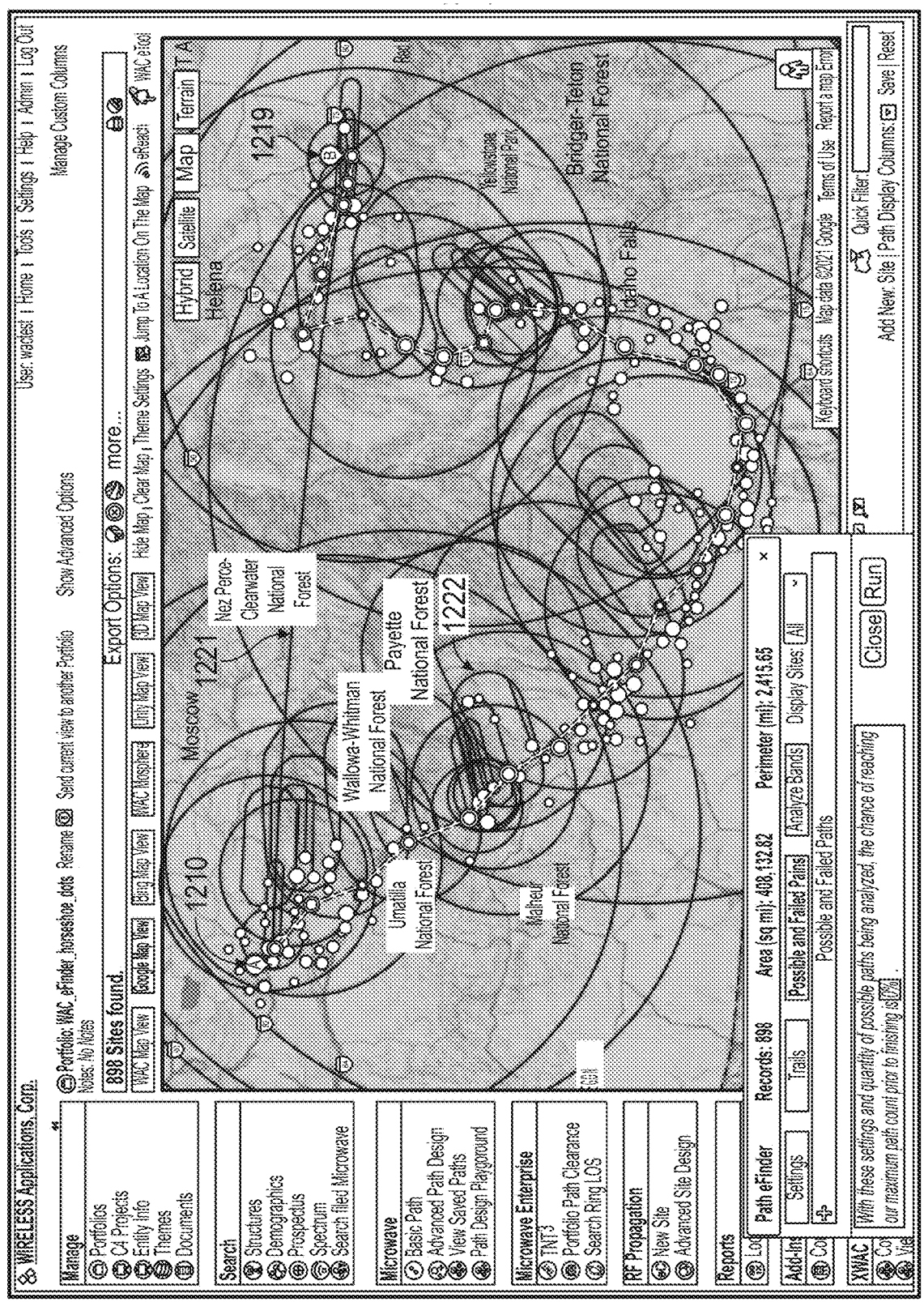
FIG. 12B shows a second example of segment buffer expansions.
Figure 12C:
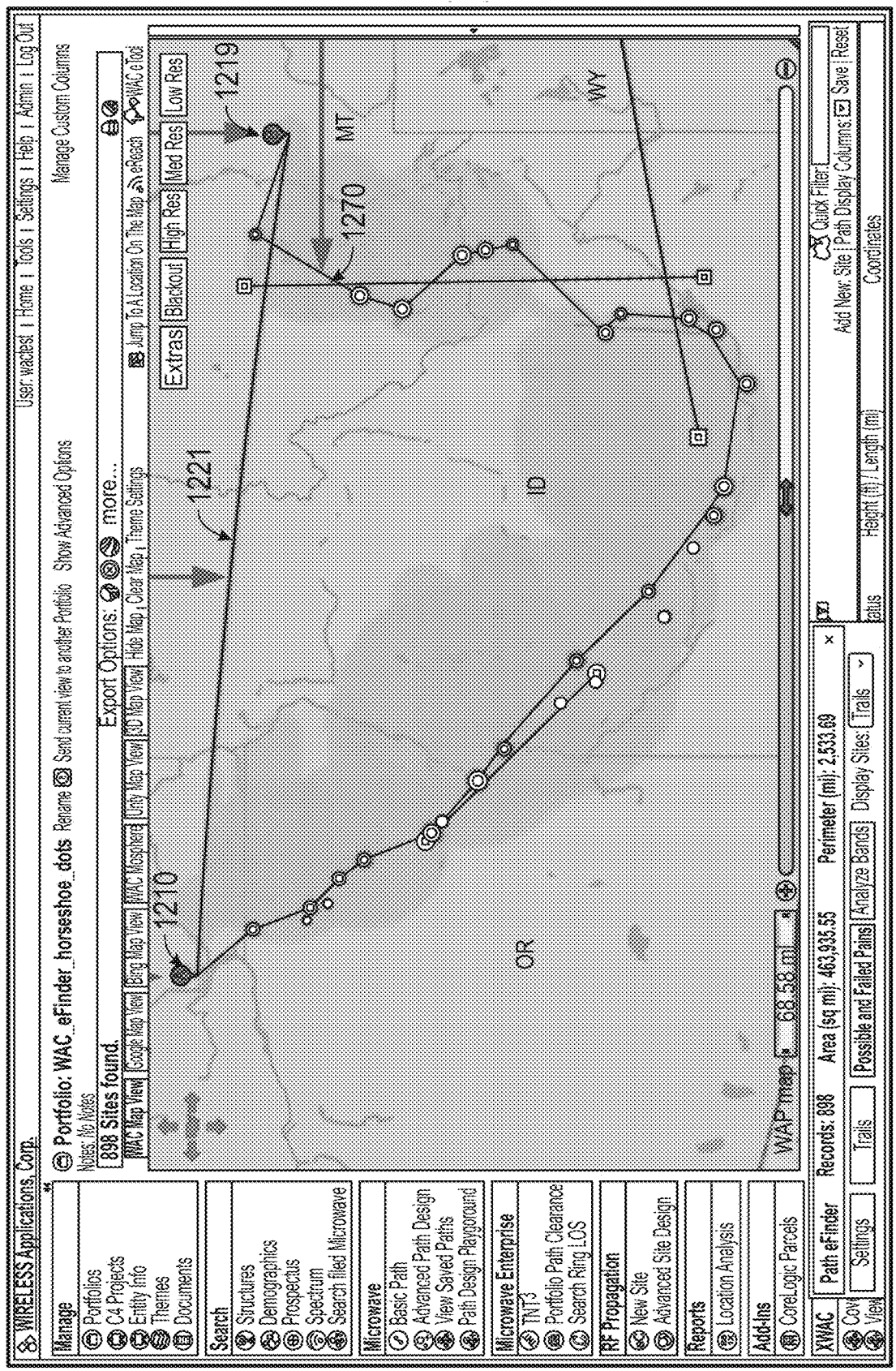
FIG. 12C shows an example radio path trail determined from the segment buffer expansions of FIG. 12B.

FIG. 12B shows a second example of segment buffer expansions with a large buffer area (e.g., a 280 mile buffer, not shown in FIG. 12B) where there are few sites along the straight line path 1221 between source site 1210 (site A) and target site 1219 (site B). This results in several segment expansions around a horse-shoe-like path, where each segment expansion (e.g., segment expansion 1222) points to the target site 1219 (site B). For example, for each segment expansion, a buffer segment can be expanded directionally out toward the target site 1219 (site B). The tool can then identify sites within the expanded segment, compute corresponding radio paths, and determine whether there are any radio paths that advance a radio path trail toward the target site 1219. If there are no sites in the expanded segment or none of the corresponding radio paths advance the radio path trail toward the target site 1219, the expanded segment can again be expanded (e.g., in width and/or radius) toward the target site 1219. Sites within the newly expanded segment can be identified, and corresponding radio paths computed. This process can repeat until radio paths advancing the radio path trail toward the target site 1219 are identified or until further expansions would violate a specified buffer area or design goals and/or constraints. By orienting the segment expansion generally towards the target site 1219, the resulting trail achieves the shortest path distance between site A and site B, even though the resulting trail diverges significantly from the straight-line path 1221. FIG. 12C shows an example radio path trail 1270 determined from the segment buffer expansions of FIG. 12B.

Linear Buffer Expansion

Figure 13:
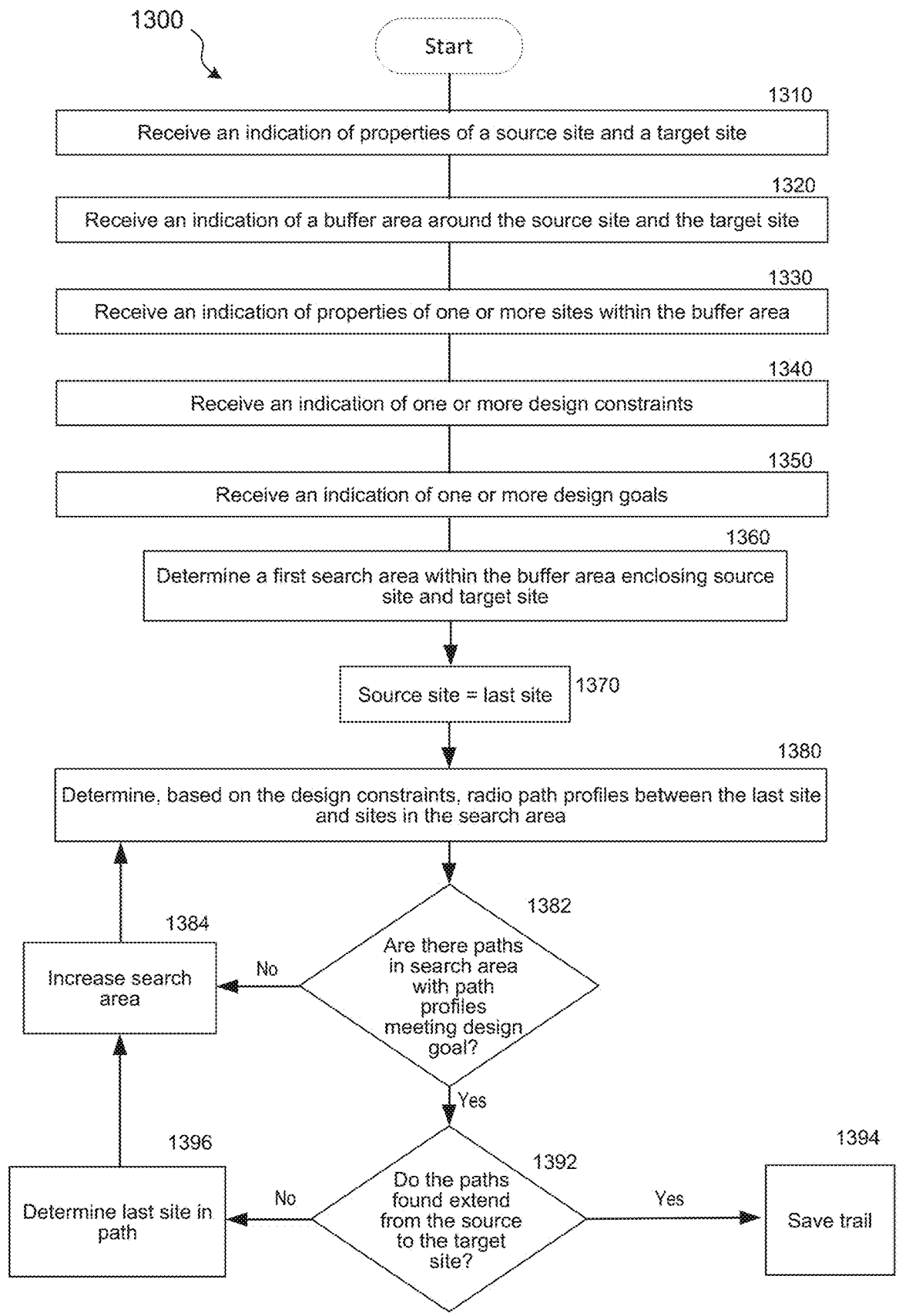
FIG. 13 is a flowchart that illustrates a second method of expanding a microwave path search area within a buffer area.

FIG. 13 is a flowchart 1300 that illustrates a second method implemented by the tool for expanding a microwave path search area within a buffer area. At block 1310, the microwave path search tool receives an indication of properties of a source site and properties of a target site. At block 1320, the microwave path search tool receives an indication of a buffer area around the source and target sites, and at block 1330 the tool receives an indication of properties of sites within the buffer area.

The indication of properties of the source/target sites and sites within the buffer area, and the indication of the buffer area or bounding region of the buffer area, can be received as described above with reference to FIGS. 3 and 6. The buffer area can include bounding regions as described above with reference to FIGS. 4A and 4B. In some implementations, only properties within buffer area expansion regions are received by the tool as described in additional detail below.

At block 1340, the microwave path search tool receives design constraints constraining certain properties of microwave paths identified between sites. For example, the design constraints can include the constraints described above with reference to FIG. 6.

At block 1350, the microwave path search tool receives design goals. For example, the design goals can include the goals described above with reference to FIG. 6.

At block 1360, the microwave path search tool determines a first search area (a first expansion area or region) within the buffer area, where the expansion area encloses the source site and the target site. The search area can be defined by a first distance beyond the source site, a second distance beyond the target site, and a third distance extending on either side of a line connecting the source and target sites.

Figure 14:
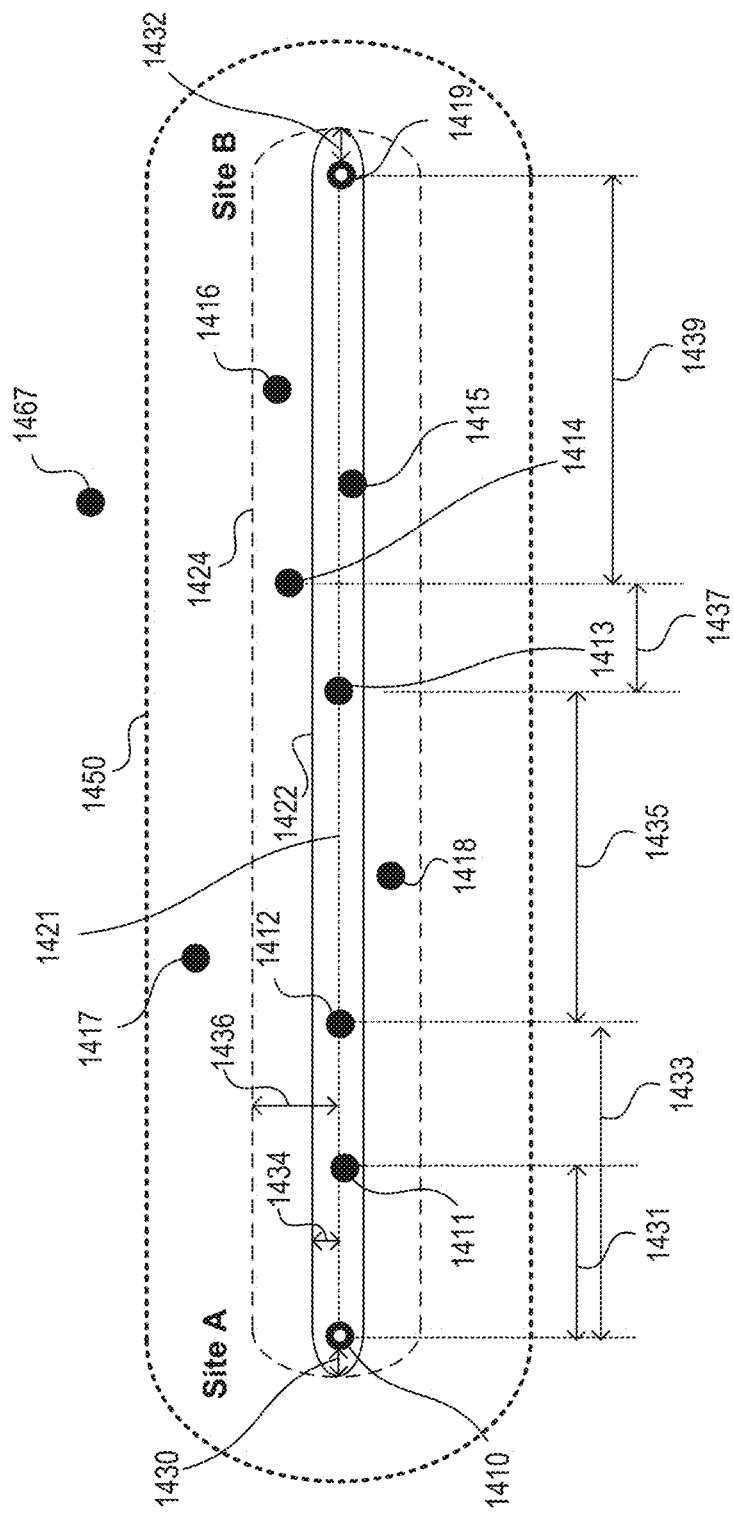
FIG. 14 is a block diagram that illustrates the second method of expanding the microwave path search area.

For example, referring to FIG. 14 that depicts a block diagram that illustrates the second method (FIG. 13) of expanding a microwave path search area, a first search area within a buffer area 1450 can be defined by the region 1422 around a source site 1410 (site A) and a target site 1419 (site B). A width (or minor length) of the first search area region 1422 can be defined by a distance 1434 from a line 1421 connecting the source site 1410 to the target site 1419. A length of the search area region 1422 (or major length) can be defined by a distance between the source and target sites, an offset distance 1430 from the source site 1410 away from the target site 1419, and an offset distance 1432 from the target site 1419 away from the source site 1410.

Referring back to FIG. 13, the microwave path search tool recursively searches for radio paths within potentially increasing search areas (expansion areas) to find a radio path trail from the source site to the target site. For the first search iteration within the first search area, the source site is considered the last site at block 1370. For subsequent iterations when a complete radio path trail is not found within the first expansion, the last site in the current partial radio path trail is identified as a starting point for subsequent iterations, as described below.

In some implementations, the tool receives only properties of sites within the search areas (expansion areas) instead of properties of all the sites within the buffer area.

At block 1380, the microwave path search tool determines radio path profiles between the last site (or source site for the first search iteration) and sites within the first search area determined at block 1360. The tool can determine a set of radio path profiles between the last site and other sites within the first search area based on the properties received at blocks 1310 and 1330, and further based on the design constraints received at block 1340 (e.g., based on latitude/longitude coordinates and structure heights at the source site and sites within the first search area, based on structure types and ratings, based on a K-factor, based on terrain and clutter data within the first search area, based on min/max distances—excluding sites not within min/max distances, etc.).

At block 1382, the microwave path search tool determines if there are any radio paths traversing sites in the first search area where the path profiles determined at block 1380 meet the design goals received at block 1350. For example, the tool can determine first if there are any sites within the first search area (if there are no sites, then no paths can be formed so the tool expands the first search area as described further below). If there are sites with the first search area, the tool can determine whether the path profiles for sites considered in the first expansion also meet certain required design goals (e.g., whether the sites have clearance). The radio paths not meeting designs goals are excluded from consideration when finding radio paths to form a radio path trail between the source site and the target site. If no valid/passing radio paths exist in the first search area, the tool expands the first search area as described below with reference to block 1384.

FIG. 14 can be used to further explain the process to determine radio paths profiles, as described in blocks 1380 and 1382 of FIG. 13. For example, at block 1380 of FIG. 13, the tool can compute a set of radio path profiles between the source site 1410 in FIG. 14, and sites within the first search area region 1422; and at block 1382 of FIG. 13, the tool can determine which path profiles meet the design goals and exclude those paths with path profiles not meeting the design goals (e.g., exclude paths with no clearance between sites). For example, the tool can compute path profiles between the source site 1410 of FIG. 14, intermediate sites 1411, 1412, 1413, 1415, and the target site 1419 (e.g., a first path profile from source site 1410 to site 1411, a second path profile from site 1410 to site 1412, etc., and a last path profile from site 1410 to site 1419).

In some implementations, the design tool determines path profiles only for paths meeting the minimum and maximum distance design constraints received at block 1340 of FIG. 13. For example, the tool can exclude path profiles from a source site to any site within the first search area that is closer than a minimum distance or further than a maximum distance.

In some implementations, the tool determines all the radio path profiles within the buffer area 1450 of FIG. 14 (including the path profile between source site 1410 and site 1414 which is outside the first search area), but considers only the path profiles within the expansion area when searching for the radio path trail.

Although only a few intermediate sites are shown in the first search area in the example of FIG. 14, there can be a large number of sites within the first search area which, in some implementations, can be used to determine the expanse of the first search area to ease computations performed at blocks 1380 and 1382 of FIG. 13.

When there are multiple potential radio paths within the first search area, the choice of the best path or the path that the tool will consider to form part of the radio path trail can be based further on the design goals (e.g., the least cost function criteria based on the design objectives of the trail) received at block 1350. For example, if sites 1411 and 1412 in FIG. 14 are both within the min/max distance constraint of site 1410 (e.g., distance 1431 and 1433 shown in FIG. 14 are each less than the max distance and greater than the min distance), and the path profiles from site 1410 to 1411, site 1410 to 1412, and site 1411 to 1412 all meet the design goals (e.g., the corresponding radio paths have sufficient clearance and other specified goals, make use of optimal structure types and ratings, etc.), three potential paths are possible: (i) a first path traversing sites 1410→1412, (ii) a second path traversing sites 1410→1411, and (iii) a third path traversing sites 1410→1411→1412 in that order. The choice of which radio path to select for the resulting radio path trail can be based on minimizing a cost of the radio path trail based on the design goal (e.g., minimizing the overall latency between site A and site B).

The microwave path search tool can use various path search algorithms (e.g., an A* search algorithm) to determine the least cost path within the first search area.

Referring again to FIG. 13, at block 1392, the microwave path search tool determines if any of the radio paths identified at block 1382 extend the radio path trail from the source site to the target site. If a complete radio path trail has been identified, the tool can save the radio path trail at block 1394 or save the best N radio path trails where "best" is based on the cost of a trail with reference to a least cost function criterion (e.g., the N trails with the lowest latency relative to other identified trails, the N trails that utilize the best structure types for construction of the radio path trails, etc.). The radio paths and radio path trails can be visualized in a user interface, such as the user interfaces described above with reference to FIGS. 10A-12C.

Conversely, if at block 1392 of FIG. 13, the tool determines that the radio paths identified at block 1382 do not create a complete radio path trail from the source site to the target site, the tool can determine at block 1396 a last site of the current best radio path trail (or last sites in the current N best radio path trails when the tool is configured to search for the N best trails), and expand the search area at block 1384. The expanded search area is larger than the first search area but less than the buffer area. A last site can be the site that is closest to the target site than other sites in the partial radio path trail (e.g., the site with a smaller distance to the target site than other sites in the set of radio paths making up the current best partial radio path trail). Sites in the expanded search area can be used to further extend the radio path trail from the last site towards the target site.

For example, referring again to FIG. 14, if a distance 1435 between site 1412 and site 1413, is greater than the max distance, the tool would not consider the radio path between sites 1412 and 1413 for the radio path trail. Because there are no other sites from site 1412 towards site B in the first search area that are within max distance, the tool expands the first search area to cover a wider area 1424 which includes site 1418. For example, the tool can increase the distance 1434 of the first search area region 1422 (e.g., by a fixed amount or a fixed multiple) to distance 1436. In some implementations, the tool can increase the distance 1434 on either side of line 1421 by an unequal amount (e.g., based on density of sites on either side of the line 1421, with smaller expansions required for the side with a higher site density) such that the search area is larger on one side of line 1421 than the other.

If the path profile between the last site 1412 and the new site 1418 in the expanded search area meets the design goal (e.g., has clearance) subject to the design constraints, the design tool can extend the radio path trail using the radio path from site 1412 to 1418. The design tool can determine what sites to use for the trail extension based on the design goals (e.g., which trail extension will minimize latency), as described above. For example, if the distance 1439 is less than max distance, the tool can decide between trail extension 1414→1415→1416→1419, trail extension 1414→1416→1419, trail extension 1414→1415→1419, and trail extension 1414→1419, based on which trail extension yields the lowest increase in latency.

At each expansion of the search area, the tool can determine sets of radio paths between sites in the expansion areas and whether the sets of identified radio paths form a complete radio path trail. For example, a radio path trail between the source site 1410 (site A) and the target site 1419 (site B) can be formed by a first set of radio paths traversing sites 1410→1411→1412→1418, and a second set of radio paths traversing sites 1418→1413→1414→1416→1419 (e.g., where there is no coverage between sites 1413 and 1415 that could have resulted in a straighter path with lower latency).

In the example of FIG. 14, site 1417 was not considered because a complete radio path trail was found within expansion search area 1424 without needing to expand further to include site 1417. Additionally, site 1467 was not considered because it fell outside the buffer area 1450.

If, for example, the distance 1437 between sites 1413 and 1414 was less than the minimum distance constraint received or entered at block 1340 of FIG. 13, the path 1413→1414 could not be used to form a radio path trail. If there is no coverage between sites 1413 and 1415, the only potential alternative path would be from site 1413 to 1416. If this path was beyond the maximum distance constraint, the tool could expand the search area further potentially considering site 1417. If, however, no path is possible considering all the sites in the buffer area 1450, the tool can report a failure to find a radio path trail. The user can then expand the buffer area (e.g., to include site 1467) and/or relax the design constraints (e.g., min/max distance) or design goals (e.g., required amount of clearance) in order to identify a satisfactory radio path trail.

In some implementations, the tool can automatically adjust the design constraints and goals and iteratively search for the best radio path trails and report the parameters associated with the best radio path trails (e.g., what amount of clearance, what min/max distance, or what structure heights resulted in a lowest latency radio path trail).

It will be appreciated that various other shapes of the path search area expansion (e.g., the segment expansions of FIGS. 6 and 7 or the linear expansions of FIGS. 13 and 14) can be used for the expansions which serve to constrain the microwave path search area to tractable subsections of the buffer area. For example, elliptical search areas, search areas with square, rectangular or rounded rectangular sections, or other regular or irregular polygon areas can be used. In some implementations, a path search area can be any arbitrary shape (e.g., received or imported into the microwave path search tool). For example, like the buffer area constraints described above, the path search area can be constrained by certain physical or radio frequency (RF) constraints, such as proximity to a beach or a body of water (e.g., limiting paths that can be formed on one side) or can bounded by country/jurisdiction or property borders (e.g., limiting sites that can be licensed, or restricting the radio path trail to areas where certain licensed or unlicensed frequency bands can be used), etc.

Failed Paths & Insights

Figure 15A:
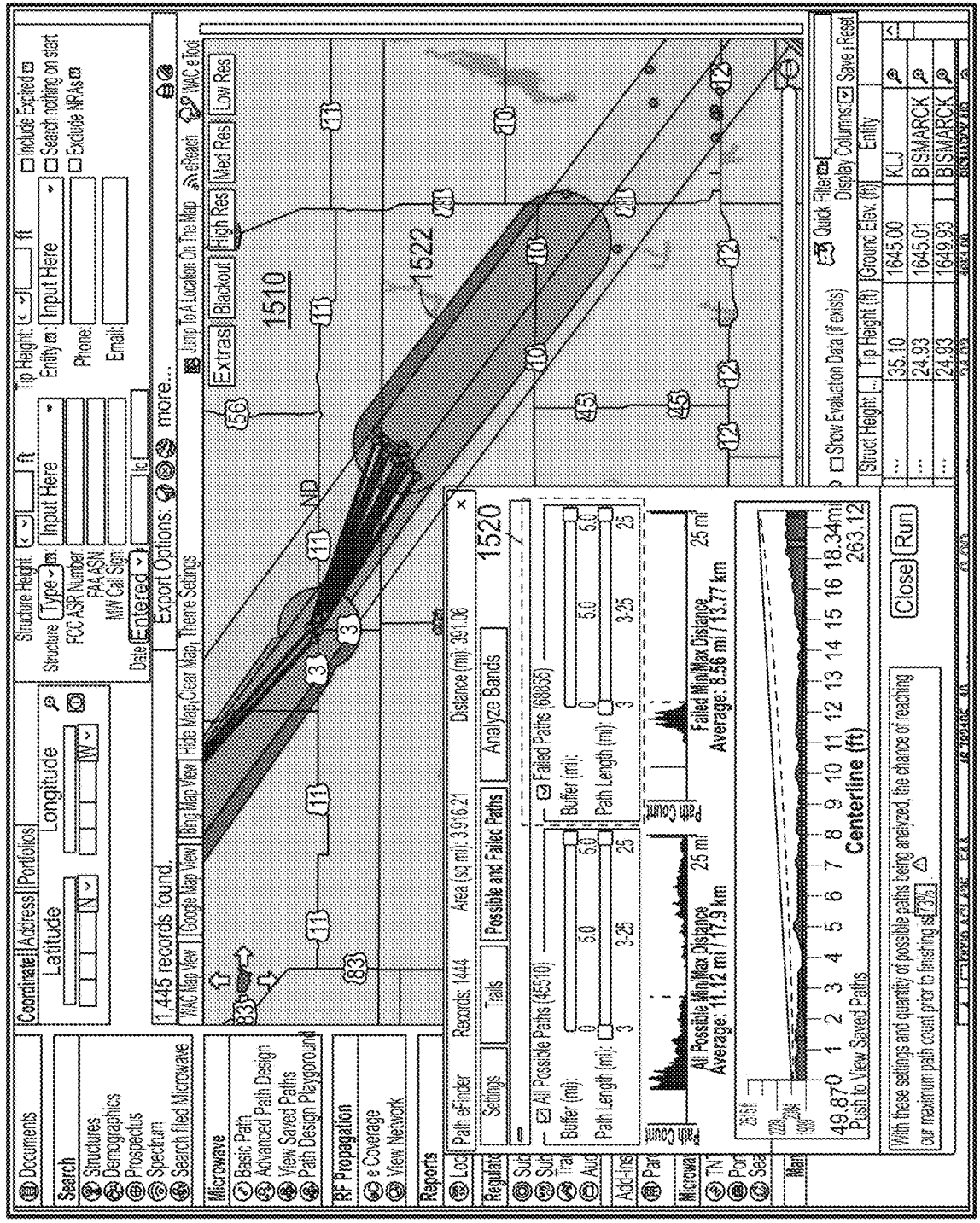
FIGS. 15A and 15B are displays of example failed radio paths.
Figure 15B:
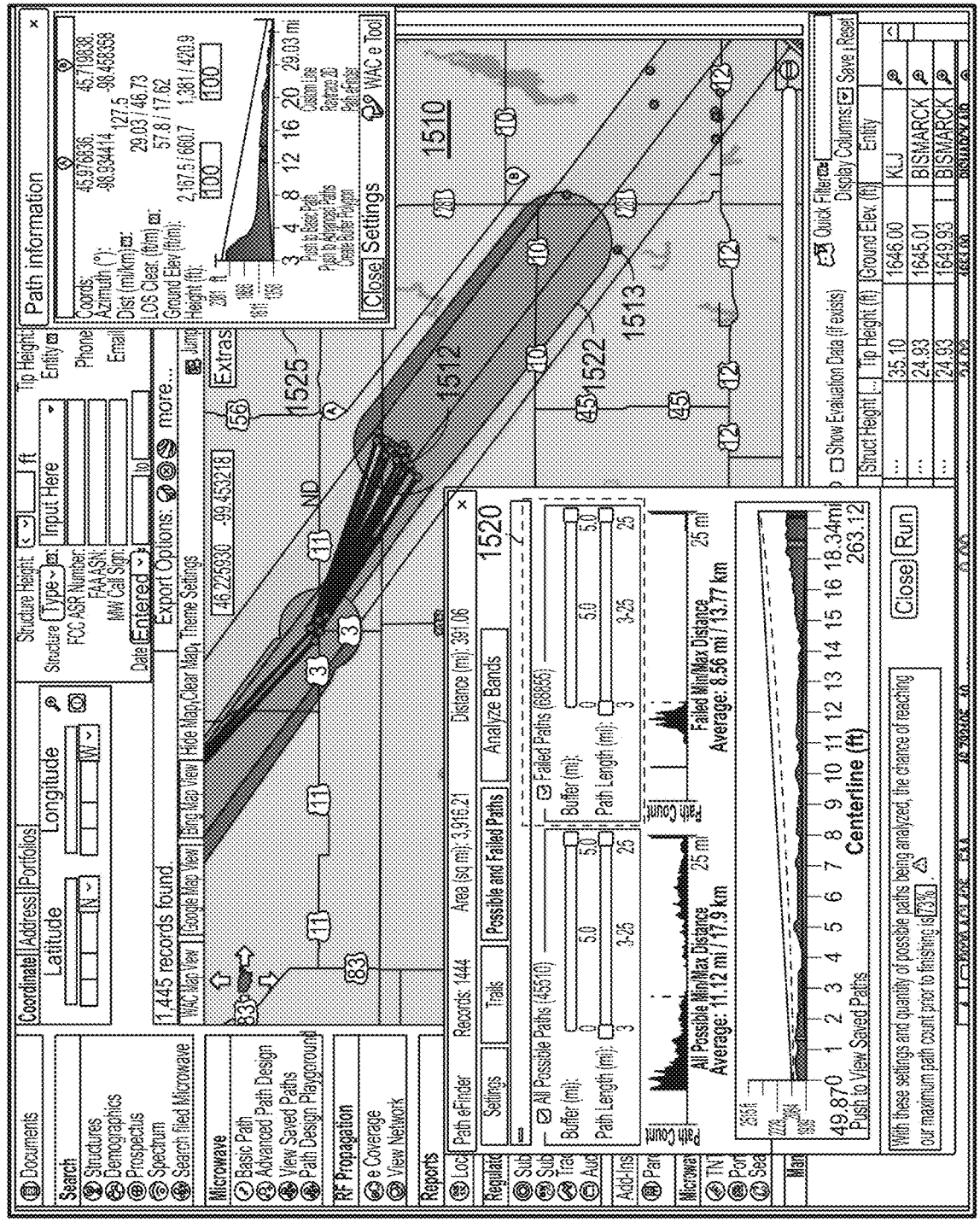

FIGS. 15A and 15B are displays of a first example of failed radio paths. In the example of FIG. 15A, based on the visualization settings selected in display section 1520, a display map 1510 of the microwave path search tool shows that there are no sites within 3-25 miles of each other within region 1522. The visual rendering of FIG. 15A can allow a network engineer to determine if a new site should be built within or near region 1522, or whether radios capable of providing a wireless link at a larger maximum distance constraint should be considered to implement a radio path trail. For example, as shown in FIG. 15B, the microwave path search tool can allow the network engineer to measure the distance between site 1512 and 1513 and perform a radio path profile analysis between the sites to determine if certain radio properties (e.g., radio power, frequency band, antenna gain, modulation method, etc.) can result in a path segment meeting certain designs goals (e.g., if the resulting link at the larger maximum distance can meet certain design objectives such as minimizing overall latency between the source and target sites). The tool can present various information (e.g., terrain or clutter data) that may be relevant to this analysis to the network engineer, such as in a display section 1525.

In some implementations, the microwave path search tool can provide a report or other indication indicating recommended radio system properties or recommended new site locations and site properties to overcome such failed paths.

Figure 16:
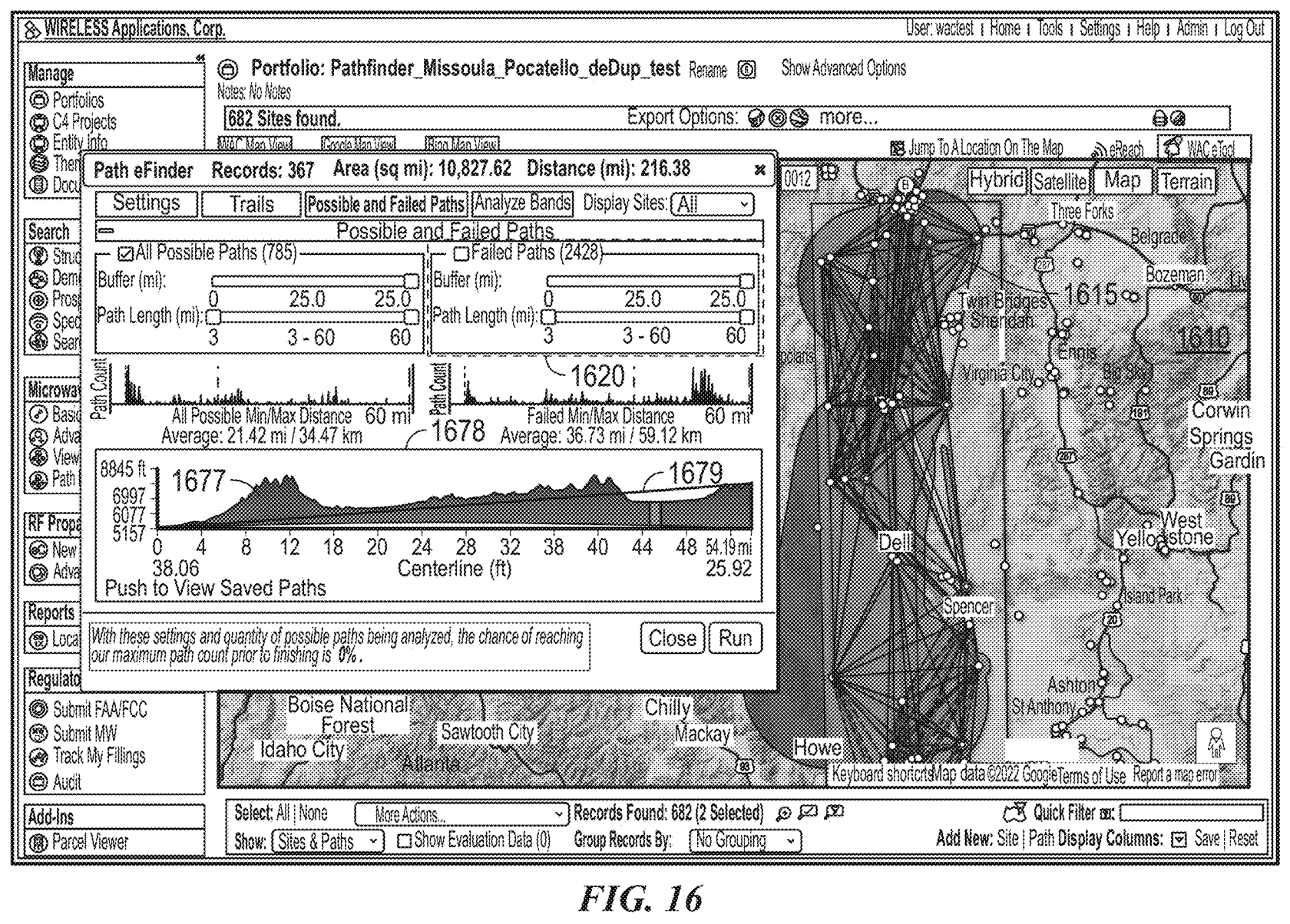

FIG. 16 is a display of a second example of failed radio paths. In the example of FIG. 16, based on the visualization settings selected in display section 1620, a display map 1610 shows the possible radio paths and failed radio paths (e.g., failed radio path groupings 1615). A path profile section 1678 shows a radio path profile 1679 and a schematic side view of clutter or terrain 1677, including a body of water approximately 45 miles from the origin. The path profile indicates that the trail failed because there was no clearance between the sites shown (e.g., line of sight and/or the first Fresnel zone is blocked by the terrain 1677). Display map 1610 and path profile section 1678 can enable the network engineer to determine problem areas and potential solutions (e.g., what height of antenna structures would be needed to provide clearance between certain problem sites). The sliders in display section 1620 can be used to visualize certain failed radio paths (e.g., failed radio paths within a certain buffer region or failed paths with a path length within a certain range).

Figure 17A:
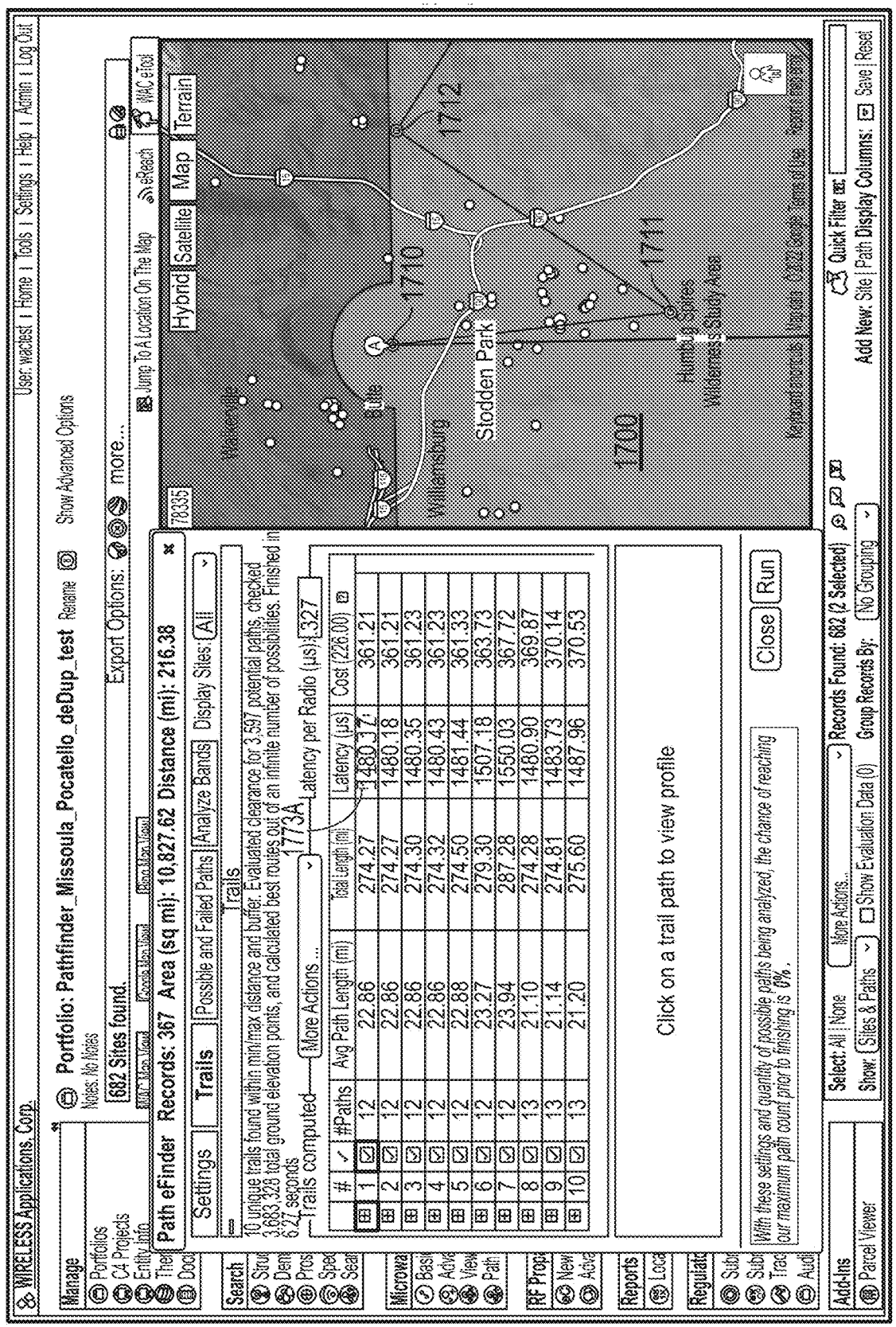
FIG. 17A is a display of an example radio path trail before optimizing the radio path trail.

FIG. 17A is a display of an example radio path trail before optimizing the radio paths. In the example of FIG. 17A, a minimum distance constraint is set to a distance larger than the distance between source site 1710 (site A) and site 1712 shown in map 1700. As a result, the radio path between site 1710 and site 1712 is not considered by the microwave path search tool and the resulting radio path trail traverses sites 1710→1711→1712 with a best total latency of 1480.17 µs as shown in display value 1773A.

Figure 17B:
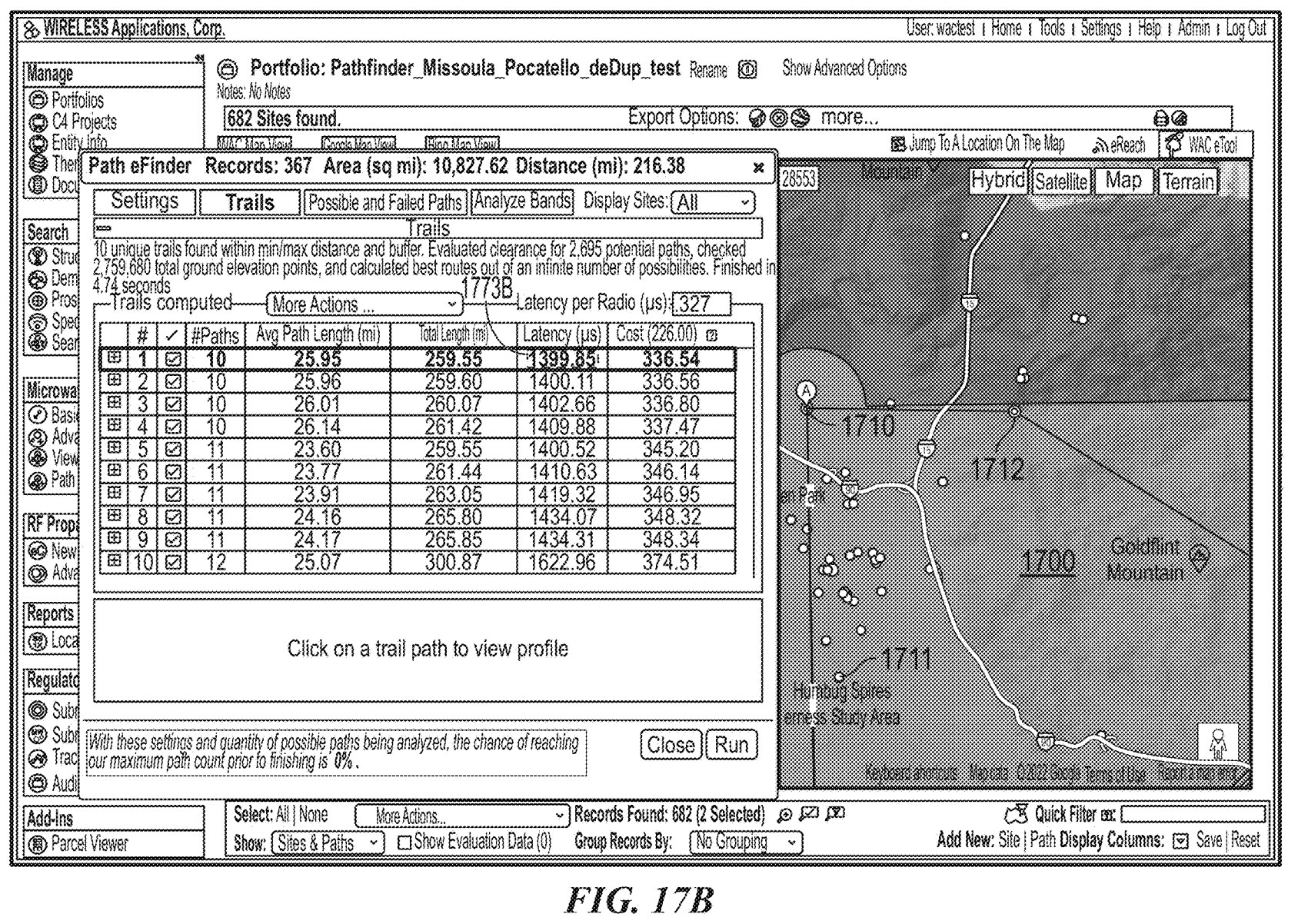

FIG. 17B is a display of an example radio path trail after optimizing the radio paths of FIG. 17A. The visual rendering in display map 1700 in FIG. 17A allows a network engineer to quickly realize that a shorter path traversing sites 1710→1712 might provide a better radio path trail than the radio path trail traversing sites 1710→1711→1712. For example, the microwave path search tool can allow the network engineer to measure the distance between sites 1710 and 1712 and compare that to the minimum distance constraint to learn that the minimum distance constraint is set to a value higher than the measured distance (e.g., min constrain set to 4 miles but the distance between 1710 and 1712 is just 3.8 miles). This can allow the network engineer to determine a value at which to set the minimum distance constraint. Relaxing the minimum distance constraint can result in the radio path trail of FIG. 17B having an improved aggregate trail latency of 1399.85 µs as shown in the display value 1773B.

In some implementations, the microwave path search tool can automatically adjust the design constraints (e.g., the minimum or maximum distance constraints), iteratively search for microwave path trails, and report the design constraints corresponding to the lowest latencies (or design constraints that best meet the design goals or design objectives of the radio path trail). Such information can guide the network engineer in evaluating tradeoffs based on competing design constraints (e.g., whether to allow a larger maximum distance for improved latency but pay more for higher power radios and/or larger dishes capable of the larger path segment distances, or whether to allow for a smaller minimum distance but potentially result in more latency, more required site leases and infrastructure costs, etc.).

FIG. 18 is a display of example radio path trails showing radio path convergence points at sites 1816 and 1817. In the example of FIG. 18, display section 1812 shows that the microwave path search run resulted in 45510 possible radio paths; and display section 1820 shows the run resulted in 68855 failed radio paths. A display of the possible radio paths shows groupings of lines 1814 converging to sites 1816 and 1817, indicating limited options for radio path trails to traverse the region of the map 1800 local to the sites 1816 and 1817.

Radio path convergence points can result from lack of sites, from sites without tall enough structures, or clearance issues related to terrain or clutter in a particular geographic area. The visualization of radio path convergence points, as in FIG. 18, can help a network engineer or user of the microwave path search tool identify critical infrastructure needed to build a radio path trail. For example, the visualization can alert a user of the importance of negotiating a lease at site 1816 or site 1817, or of building a new antenna tower with the appropriate height at or near the sites 1816 and 1817.

Pre-Run Analysis and Notifications

Figure 19:
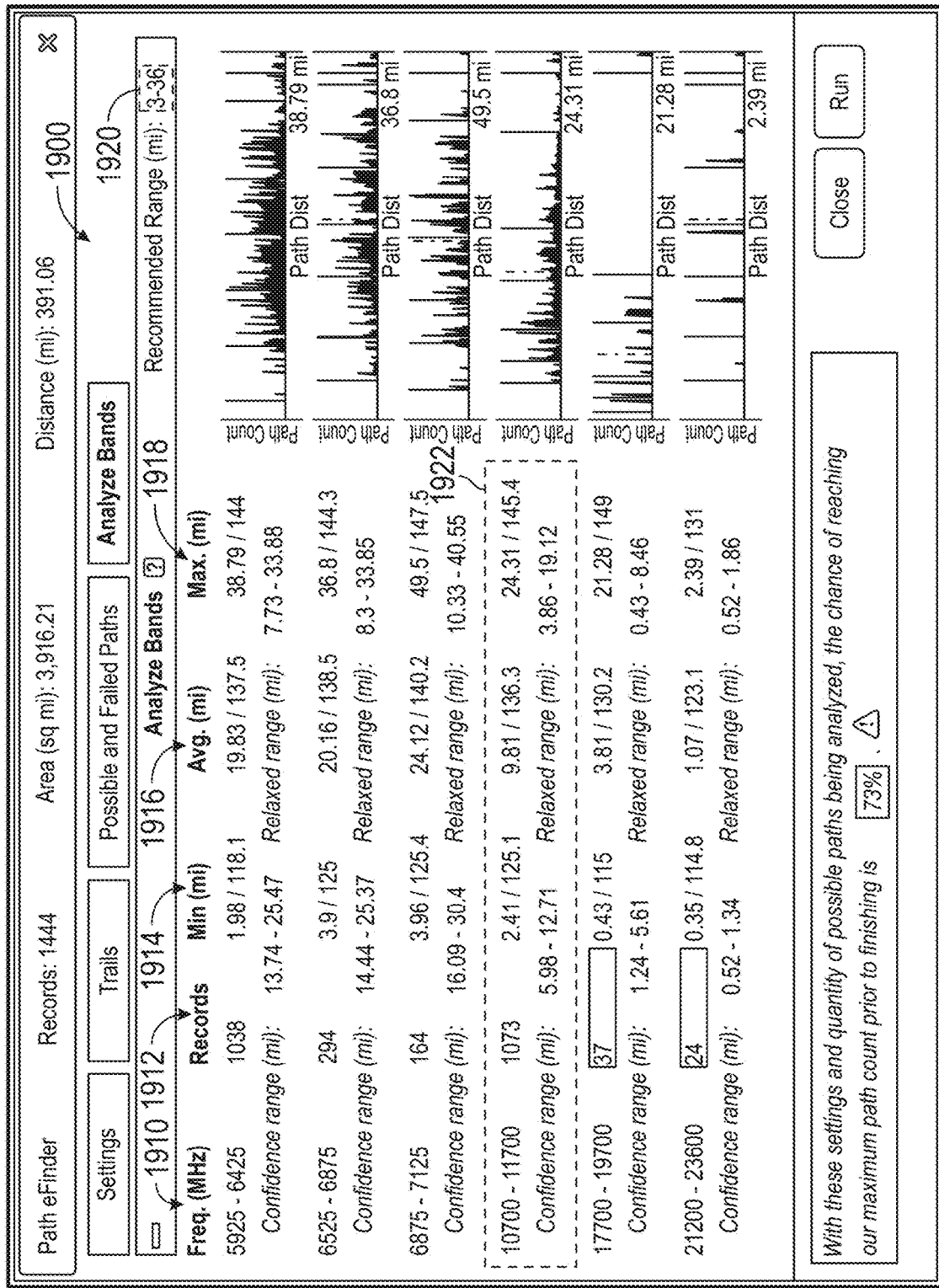
FIG. 19 is an example display to analyze frequency bands in a geographic area.

FIG. 19 is an example display 1900 that can be used to analyze and visualize frequency bands in a geographic area. The microwave path search tool can query or otherwise receive records related to microwave radio links in the geographic area surrounding the source site and the target site (e.g., within the buffer area, or within a certain boundary encompassing the buffer area such as state, city, county, etc.). The records can, for example, be related to licensing or registration records deposited or filed with regulatory authorities (e.g., the Federal Communications Commission (FCC)) describing properties of radio frequency radio links in the geographic area of interest and for frequency bands of interest.

For example, the display 1900 shows a column 1910 of different frequency bands of interest; a column 1912 indicating the number of records that were retrieved or received corresponding to the frequency bands of column 1910; a column 1914 indicating minimum distances of the filed paths as shown in the received records; a column 1916 indicating average distances of the filed paths; and a column 1918 indicating maximum distances of the filed paths.

The tool can perform statistical analysis on the record data (e.g., the tool can smooth data, eliminate outliers, etc.) to obtain a minimum and maximum radio path distance with a certain confidence level (e.g., a 95% confidence level). The tool can also allow for an estimate relaxation within some tolerance level to allow for path length estimates with smaller minimum distances and larger maximum distances which can provide additional flexibility in designing the radio paths if the estimates are applied to the microwave path search design constraints.

For example, the 1073 records corresponding to the 10.7-11.7 GHz frequency band shown in display section 1922 result in an estimated minimum path distance of 5.98 miles and an estimated maximum path distance of 12.71 miles (and a relaxed min/max path range of 3.86-19.12 miles). From this information, a user of the tool can determine that, in the given geographic area, other users were able to design 11 GHz radio links extending as much as 12.71 miles (e.g., the analysis can indicate that using the same 11 GHz radio links, users in a different geographic area could build longer or shorter links which could indicate some differences in the radio environment of the two geographic locations). A relaxed range of 19.12 miles can be used in the analysis, for example, by setting the maximum distance constraint to 19.12 miles and observing the properties of the found trails (e.g., using the trail display and path drill-down options described above with reference to FIGS. 10A and 10B). If the resulting trail includes path segments that are no more than 12.71 miles, this would give the user confidence that the radio paths are within the range that other users in the area have been able to successfully utilize.

The tool can also aggregate the min/max paths lengths of different frequency bands to determine a recommended range (e.g., FIG. 19 shows a recommended range of 3-36 miles in display section 1920 which can be used as the minimum/maximum constraint). In some implementations, the tool can automatically use statistics from the distributions of distances in the existing paths records to set the design constraints and iterate through different frequency bands to determine which frequency band yields radio path trails that best meet the design objectives (e.g., what frequency band will result in radio path trails with minimum latency and/or minimum cost, etc.). The tool features described in FIG. 19 thereby simplify use of the tool by providing guidance to the user of appropriate distances and frequency bands to utilize in radio path trail design.

Figure 20:
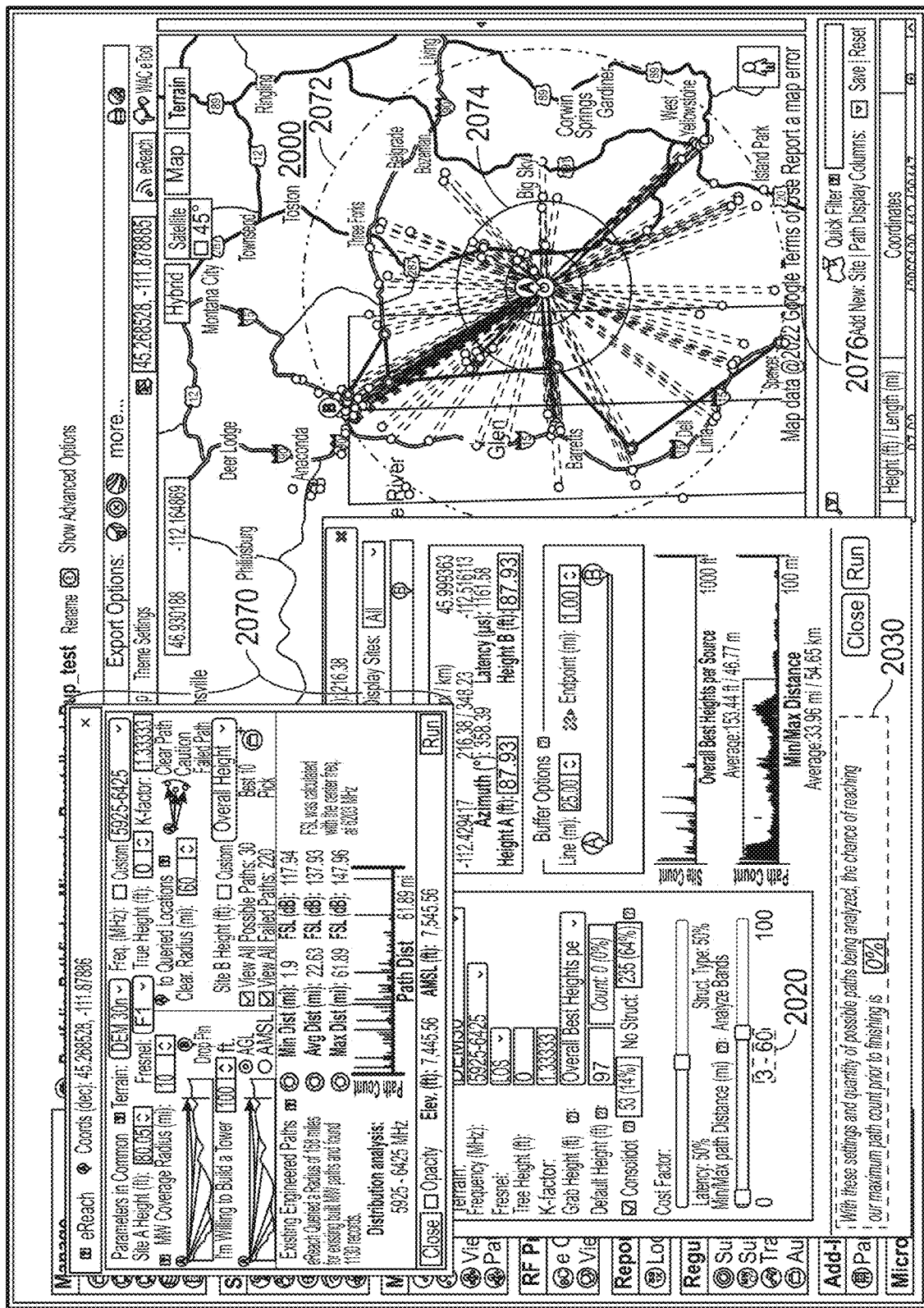
FIG. 20 is an example display and map showing a pre-run analysis of a minimum and maximum path constraint.

FIG. 20 is an example display and map showing a pre-run analysis of a minimum and maximum path constraint. For example, before the microwave path search tool determines the radio path trail (or performs path profile computations to find radio paths that can form the radio path trail), the microwave path search tool (and/or a related microwave design analysis tool) can analyze the design constraints to determine if a radio path trail can be found using the specified design constraints.

For example, with a 3-60 mile min/max distance constraint shown in display section 2020, and based on the location coordinates of the sites with respect to the buffer area, the pre-run analysis tool can determine if a radio path trail can be formed from the source site to the target site where each path within the trail meets the min/max distance constraint without considering other design goals (e.g., without considering whether there is clearance in the paths). If, for example, no trail can be formed based on the min/max design constraint, the design tool can generate a notice to the user alerting them that no radio path trails are possible within the min/max distance. Such a notice indicates to the user that there is no need to continue analysis (e.g., to continue to compute path profiles) without reconsidering or loosening the design parameters. For example, site A in FIG. 20 is positioned outside of the buffer area 2076 defined by the user. Therefore, the tool can present a warning to the user indicating that no trails are possible within the min/max distance specified by the user, based at least in part on site A's position outside of the buffer area 2076.

A user interface display 2070 can indicate a minimum (min), average (avg), and maximum (max) distance between sites, and a free space path loss (FSL) for each min, avg, and max distance. A radial 2072 can be overlayed on display map 2000 around a site to depict the maximum distance, a radial 2074 can be overlayed on the display map 2000 around the site (e.g., site A) to depict the average distance, and a radial (not shown in FIG. 20) can be overlayed on the display map 2000 around the site (e.g., site A) to depict the minimum distance.

The tool can also perform additional pre-run analysis to determine the likelihood that the radio path trail search would be successful. For example, before the tool determines the radio path trail (or performs path profile computations to find radio paths that can form the radio path trail), display section 2030 can indicate a probability of hitting a maximum number of paths that the tool can efficiently handle based on the design constraints entered (e.g., based on the min/max distance, based on the buffer area, based on whether the option to consolidate sites is selected, based on the number of sites in the record, etc.). In some implementations, the tool can abort a run if it encounters more than a threshold number of radio paths to analyze. The warning in display section 2030 can thus allow the user to adjust the design constraints prior to analyzing radio paths and computationally overburdening the tool.

In some implementations, the tool can base the probability indicated in display section 2030 on a prediction of the number of search area segment expansions or linear expansions that might be required before the search area expansions enclose more radio paths than a pre-set or predefined tool limit. For example, a 0% probability might indicate that even with search area expansions enclosing the entire buffer area, the number of paths would be less than the tool limit (e.g., where there are few sites in the buffer area or few sites meeting the min/max constraint); a 100% probability might indicate that the number of paths found will hit the tool limit even without a search area expansion (e.g., for very high site density meeting min/max distance within the minimum expansion area); a 90% probability might indicate that the paths found will hit the tool limit after the first search area expansion; etc. For example, notice 340 in FIG. 3 indicates that there is a 91% chance that the tool will hit the maximum path count limit based on the path search parameters shown in the user interface display of FIG. 3.

Computer System & Network

Figure 21:
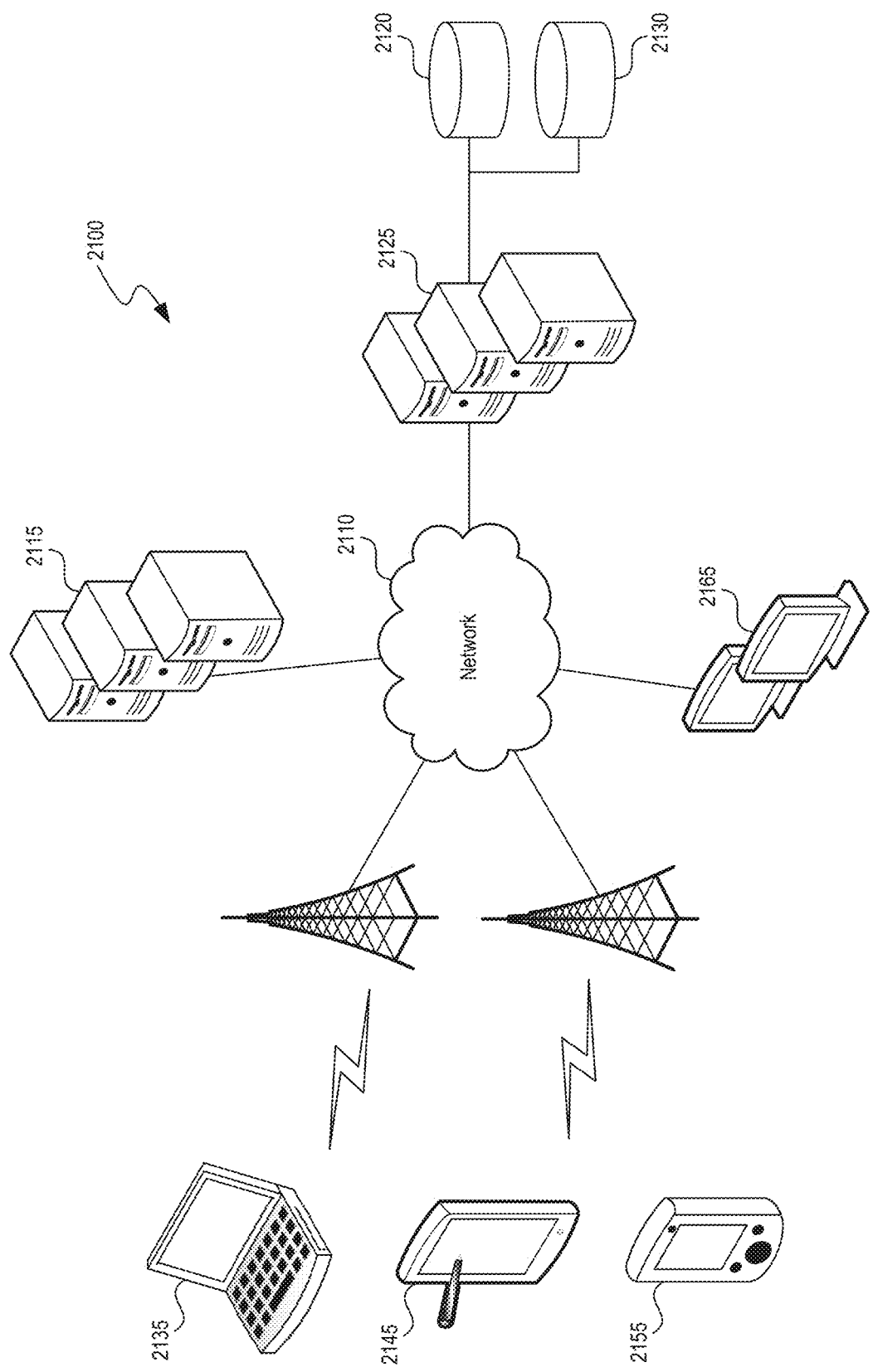
FIG. 21 is a block diagram that illustrates an example of a network environment in which at least some operations described herein can be implemented.

FIG. 21 and the following discussion provide a brief, general description of a suitable environment in which a wireless design and site analysis tool can operate. Although not required, aspects of the invention are described in the general context of computer-executable instructions, such as routines executed by a general-purpose computer, a personal computer, a server, or other computing system. The tool can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or any combination of such components. Computer-executable instructions may also be stored in one or more computer-readable storage mediums or devices, such as magnetic or optical-based disks, flash memory devices, or any other type of non-volatile storage medium or non-transitory medium for data. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes, modules and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Aspects of the wireless design and site analysis tool can be practiced in distributed computing environments, where tasks or modules are performed by remote processing devices, which are linked through a communication network, such as a Local Area Network ("LAN"), Wide Area Network ("WAN"), or the Internet.

Referring to the example of FIG. 21, a representative environment 2100 in which aspects of the described technology can operate include one or more client computing devices 2135, 2145, 2155, and 2165 capable of running a web browser of other desktop of server application, and servers 2115 and 2125, capable of interacting with a web server and remotely communicating with the client computing devices. The client computing devices communicate with the servers through network 2110 including, for example, the Internet.

Aspects of the wireless design and site analysis tool can be practiced by the client computing devices 2135, 2145, 2155, and 2165 and server devices 2115 and 2125. For example, client computing devices can run a web browser to login to a web application on a web server hosted on the server devices 2115 and 2125, provide user input via the web browser to configure the site analysis input parameters as needed, and trigger the computations of microwave path searches on the web application or at the web server. The web application implementing the microwave path search tool, or the web server serving the web application, can obtain additional input data from third party storage devices or servers 2120 and 2130. These storage devices can also be connected to the web server or client devices through the network 2110 or can be warehoused locally on the server computers 2115 and 2125, or on the client devices 2135, 2145, 2155, and 2165. Such input data can include, for example, National Land Cover Database (NLCD) data, Light Detection and Ranging (LIDAR) data, and Federal Communication Commission (FCC) Microwave Source data.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and the assignee's concurrently filed U.S. patents application Ser. Nos. 18/175,690 and 18/175,727, respectively entitled MICROWAVE PATH SEARCH USING LINEAR BUFFER EXPANSIONS and MICROWAVE PATH SEARCH USING SEGMENTED BUFFER EXPANSIONS BETWEEN SITES, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

We claim:

1. At least one computer-readable storage medium, excluding transitory signals and carrying instructions, which, when executed by at least one data processor of a system for finding a radio path trail between a first site at a first geographic location and a second site at a second geographic location, cause the system to:
   receive first information related to the first geographic location of the first site and second information related to the second geographic location of the second site;
   receive third information related to a buffer area around the first geographic location and the second geographic location, the third information comprising a first distance beyond the first geographic location in a direction away from the second geographic location, a second distance beyond the second geographic location in a direction away from the first geographic location, and a third distance extending on either side of a line connecting the first and second geographic locations;
   receive fourth information comprising one or more properties of one or more sites within the buffer area, wherein the one or more properties comprise a height of a structure at each of the one or more sites;
   receive fifth information comprising one or more design constraints, wherein the one or more design constraints comprise a minimum distance and a maximum distance between two consecutive sites in a particular radio path trail;
   generate, based on the first, second, third, fourth, and fifth information, a set of candidate radio path trails,
      wherein each candidate radio path trail traverses at least one site of the one or more sites within the buffer area;
   generate, for each candidate radio path trail, a score based on the one or more design constraints;
   select, based on a respective score of each candidate radio path trail, one or more selected radio path trails; and
   display a visual representation of the one or more selected radio path trails on a user interface.

2. The at least one computer-readable storage medium of claim 1, wherein:
   the one or more properties of the one or more sites within the buffer area further comprise a latitude, a longitude, an identifier of the structure, and a type and rating of the structure; and
   the height of the structure comprises a tip height, a structure height, or one or more centerline heights.

3. The at least one computer-readable storage medium of claim 1, wherein the fifth information further comprises one or more design goals, and wherein determining, based on the first, second, third, fourth, and fifth information, the radio path trail comprises:
   starting from the first geographic location, finding a first set of radio paths between one or more sites in an initial section of the buffer area,
      wherein each radio path in the first set of radio paths meets the one or more design goals subject to the one or more design constraints;
   expanding the initial section of the buffer area to define an expanded section of the buffer area when no radio paths meeting the one or more design goals subject to the one or more design constraints are found within the initial section or when the first set of radio paths do not extend the radio path trail from the first to the second geographic locations; and
finding a second set of radio paths between one or more sites in the expanded section of the buffer area.

4. The at least one computer-readable storage medium of claim 3, wherein finding the first set of radio paths comprises:
determining, based on the one or more design constraints, a first set of radio path profiles between the first geographic location and each site in the one or more sites in the initial section of the buffer area;
determining which radio path profiles in the first set of radio path profiles meet the one or more design goals; and
identifying one or more radio paths having the radio path profiles that meet the one or more design goals,
wherein the identified one or more radio paths extend the radio path trail by a larger distance towards the second geographic location than other radio paths having radio path profiles that also meet the one or more design goals.

5. The at least one computer-readable storage medium of claim 3, wherein finding the first set of radio paths and finding the second set of radio paths is based on an A* path search algorithm.

6. The at least one computer-readable storage medium of claim 1, wherein the one or more properties of the one or more sites within the buffer area comprise an aggregated property of a plurality of sites within a threshold distance of each other, wherein the aggregated property comprises a structure height corresponding to a tallest structure among structures at the plurality of sites.

7. A method for finding a radio path trail between a first geographic location and a second geographic location, the method comprising:
receiving the first geographic location corresponding to a first site and the second geographic location corresponding to a second site;
receiving a definition related to a buffer area around the first geographic location and the second geographic location;
receiving one or more properties of one or more sites within the buffer area, the one or more sites being different from the first site and the second site;
receiving one or more design constraints and one or more design goals;
generating, based on the first and second geographic locations, the buffer area, the one or more properties of the one or more sites, the one or more design constraints, and the one or more design goals, a set of candidate radio path trails extending from the first geographic location to the second geographic location, wherein the radio path trail traverses at least one site of the one or more sites within the buffer area;
generating, for each candidate radio path trail, a score based on the one or more design constraints;
selecting, based on a respective score of each candidate radio path trail, one or more selected radio path trails; and
displaying a visual representation of the one or more selected radio path trails on a user interface.

8. The method of claim 7, wherein the one or more properties of the one or more sites within the buffer area comprise a latitude, a longitude, an identifier of a structure at each of the one or more sites, and a height of each of the structure.

9. The method of claim 7, wherein the one or more design constraints comprise a minimum distance between two contiguous sites in the radio path trail, a maximum distance between the two contiguous sites, a type of height of a structure corresponding to the one or more sites, a K-factor, clutter data, or tree height data.

10. The method of claim 9, wherein the type of height of the structure comprises an overall best height available, a tip height, a structure height, or a maximum centerline height.

11. The method of claim 9 further comprising:
before determining the radio path trail extending from the first geographic location to the second geographic location, determining, based on location coordinates of the one or more sites within the buffer area, based on the minimum distance, and based on the maximum distance, whether a particular radio path trail from the first geographic location to the second geographic location can be formed; and
generating a notification when the particular radio path trail cannot be formed.

12. The method of claim 7, wherein the one or more design goals comprise (i) a required Fresnel zone clearance and (ii) one or more criteria associated with a least cost function, and wherein the one or more criteria comprise a latency criterion to minimize a network latency of the radio path trail.

13. The method of claim 7, wherein the one or more properties of the one or more sites within the buffer area comprise an aggregated property of a plurality of sites within a threshold distance of each other.

14. The method of claim 13 further comprising displaying the plurality of sites as a single consolidated site, wherein the single consolidated site comprises an indication of a quantity of sites in the plurality of sites.

15. The method of claim 7 further comprising, displaying on the user interface, the radio path trail and one or more radio paths within the buffer area, wherein a radio path in the one or more radio paths that meets the one or more design goals subject to the one or more design constraints is displayed with a visual treatment that is different from a visual treatment of a radio path that does not meet the one or more design goals.

16. The method of claim 7 further comprising:
before determining the radio path trail extending from the first geographic location to the second geographic location, receiving a characterization of a plurality of existing radio paths located within an area proximate to or encompassing the first and second geographic locations,
wherein the characterization comprises frequency band information and radio path distance information; and
determining, based on the radio path distance information a minimum distance design constraint and a maximum distance design constraint.

17. The method of claim 7, wherein determining the radio path trail extending from the first geographic location to the second geographic location comprises:
starting from the first geographic location, finding a first set of radio paths between one or more sites in an initial section of the buffer area,
wherein each radio path in the first set of radio paths meets the one or more design goals subject to the one or more design constraints;
expanding the initial section of the buffer area to define an expanded section of the buffer area when no radio paths meeting the one or more design goals subject to the one or more design constraints are found within the initial section or when the first set of radio paths do not extend the radio path trail from the first geographic location to the second geographic location; and finding a second set of radio paths between one or more sites in the expanded section of the buffer area.

18. The method of claim 17, wherein finding the first set of radio paths comprises:

determining, based on the one or more design constraints, a first set of radio path profiles between the first geographic location and each site in the one or more sites in the initial section of the buffer area; and identifying one or more radio paths having radio path profiles that meet the one or more design goals.

19. The method of claim 7, wherein the visual representation is rendered on the user interface in accordance with a particular visual treatment for each selected radio path trail, the method further comprising:

determining the particular visual treatment for each selected radio path trail based on a respective score of the selected radio path trail.

20. The method of claim 7, wherein the at least one site is distinct from the first site and the second site.

* * * * *